United States Patent
Berneth et al.

(10) Patent No.: US 6,631,023 B1
(45) Date of Patent: Oct. 7, 2003

(54) ELECTROCHROMIC DISPLAY DEVICE WITH POWER LEADS INSULATED FROM THE ELECTROCHROMIC MEDIUM

(75) Inventors: Horst Berneth, Leverkusen (DE); Uwe Claussen, Leverkusen (DE); Ralf Neigl, Yorktown Heights, NY (US); Dietrich Haarer, Bayreuth (DE); Stephan C. Schmidt, Oberschleissheim (DE); Wolfgang Jacobsen, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/719,068
(22) PCT Filed: May 28, 1999
(86) PCT No.: PCT/EP99/03703
§ 371 (c)(1),
(2), (4) Date: Mar. 26, 2001
(87) PCT Pub. No.: WO99/64926
PCT Pub. Date: Dec. 16, 1999

(30) Foreign Application Priority Data

Jun. 6, 1998 (DE) .......................................... 198 25 371

(51) Int. Cl.$^7$ .............................. G02F 1/15; C23C 14/00
(52) U.S. Cl. ................... 359/265; 359/267; 359/900; 204/192.22
(58) Field of Search ................................. 359/265, 366, 359/267, 273, 274, 269; 204/192.22; 429/304, 33, 192

(56) References Cited

U.S. PATENT DOCUMENTS

| | | | | |
|---|---|---|---|---|
| 4,193,670 A | * | 3/1980 | Giglia et al ................. 359/274 |
| 4,652,090 A | * | 3/1987 | Uchikawa et al. .......... 359/267 |
| 4,940,315 A | * | 7/1990 | Demiryont ................... 359/267 |
| 5,011,582 A | * | 4/1991 | Oshikawa et al. .......... 205/759 |
| 5,122,896 A | * | 6/1992 | Mizusaki et al. ........... 359/273 |

* cited by examiner

Primary Examiner—Hung Xuan Dang
Assistant Examiner—Tuyen Tra

(57) ABSTRACT

Electrochromic display device comprising a pair of glass or plastic plates or plastic films of which at least one plate or film or both plates or films is/are provided on one side each with an electrically conducting coating. At least one plate or film and its conductive coating is transparent. On at least one of the two plates or films, the electrically conductive layer is divided into separate segments which are individually connected to a power source and each has an electric lead from the edge of the device. The plates or films are joined via a sealing ring on the sides on which they are conductively coated. The volume formed by the two plates or films and the sealing ring is filled with an electrochromic medium. The electric leads to the segments are electrically insulated from the electrochromic medium. Methods for producing an electrochromic display device in which the segments and their power leads are first produced by removal of material from a continuous conductive coating or are applied to the plates or films and the electrically insulating layer is subsequently applied to the power leads. Method of operating an electrochromic display device in which the display device is operated using a constant, pulsed or variable-amplitude DC potential or using an AC potential.

31 Claims, 6 Drawing Sheets

ELECTROCHROMIC DISPLAY DEVICE WITH POWER LEADS INSULATED FROM THE ELECTROCHROMIC MEDIUM

The invention relates to an electrochromic display device having display segments which are individually connected to a power source and whose electric leads are insulated from the electrochromic medium. The invention also relates to a method of producing such a display device.

Electrochromic devices containing an electrochromic system are already known. Electrochromic systems alter their spectral absorption under the action of an electric field.

In WO-A 94/23333, electrochromic materials of different constructions are compared but are not used as display devices:

Construction a: The electrochromic substances are present in solid form as a film or layer on the electrodes (cf. D. Theis in Ullmann's Encyclopedia of Industrial Chemistry, Vol. A8, p. 622, Verlag Chemie 1987)

Construction b: The electrochromic substances are deposited on the electrodes as a layer during the redox process (cf. Ullmann, see above).

Construction c: The electrochromic substances remain permanently in solution.

For construction a), the pair tungsten oxide/palladium hydride is the best known electrochromic material.

For construction b), viologens have been described as electrochromic substances. These devices are not self-extinguishing, so the image produced remains after the electric potential has been switched off and can be extinguished again only by reversing the polarity. Such devices are not particularly stable and do not allow a large number of switching cycles.

In addition, particularly cells based on tungsten oxide/palladium hydride cannot be operated in transmitted light because of light scattering from these electrochromic layers, but can only be operated using reflected light.

Elektrokhimiya, 13, 32–37 (1977), 13, 404–408, 14, 319–322 (1978), U.S. Pat. No. 4,902,108 and U.S. Pat. No. 5,140,455 disclose an electrochromic system having the last-named construction c). An electrochromic cell which is built up of glass plates having a conductive coating contains a solution of a pair of electrochromic substances in an inert solvent.

The pair of electrochromic substances used comprises one electrochemically reversibly reducible substance and one reversibly oxidizable substance. In their ground state, both are colourless or only slightly coloured. Under the action of an electric potential, one substance is reduced and the other is oxidized, with both becoming coloured. After switching off the potential both substances return to the ground state, resulting in decolouration or lightening of the colour.

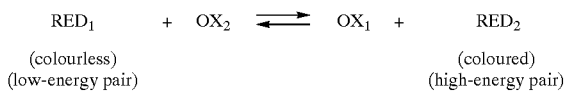

$RED_1$ + $OX_2$ ⇌ $OX_1$ + $RED_2$ (colourless)                         (coloured)
(low-energy pair)               (high-energy pair)

It is known from U.S. Pat. No. 4,902,108 that pairs of redox substances in which the reducible substance has at least two chemically reversible reduction waves in the cyclic voltammogram and the oxidizable substance correspondingly has at least two chemically reversible oxidation waves are suitable.

However, according to WO-A 94/23333, such solution systems of construction c) have serious disadvantages.

The diffusion of the electrochromic substances in the solution results in fuzzy colour boundaries and causes high power consumption for maintaining the coloured state, since the coloured substances are permanently being removed by recombination and reaction at the respective opposite electrode.

Nevertheless, various applications have been described for such electrochromic cells of the construction c). Thus, for example, they can be configured as an automobile rearview mirror which can be dimmed during night driving by application of a voltage and thus prevents dazzling by headlights of following vehicles (cf., for example, U.S. Pat. No. 3,280,701, U.S. Pat. No. 4,902,108, EP-A 0 435 689). Furthermore, such cells can also be used in window panes or automobile sunroofs where they dim sunlight after application of a voltage. The use of such devices as electrochromic display devices, for example in segmented or matrix displays with structured electrodes, has likewise been described (DE 196 31 728).

Electrochromic devices comprise a pair of glass or plastic plates which are each provided on one side with an electrically conductive coating, e.g. indium-tin oxide (ITO). At least one of these plates is transparent. In the case of an automobile mirror, one of the plates is mirrored. A cell is constructed from these plates by joining them, preferably adhesively bonding them, by means of a circular or rectangular sealing ring with their conductively coated sides facing one another. The sealing ring establishes a uniform spacing between the plates of, for example, from 0.01 to 0.5 mm. This cell is filled with an electrochromic medium. The two plates can be separately connected to a power source via the electrically conductive layers.

In electrochromic display devices, at least one of the two electrically conductive layers is divided into segments which are individually connected to a power source and are electrically insulated from one another. These segments are provided with power via electric leads which each lead to an edge of the respective plate and are there connected to a power source by means of, for example, clips, soldered points, conductive paint or other electrically conductive connections.

During operation of the electrochromic device, an electric potential between the conductively coated plates is applied to selected segments, so that the desired information is displayed by colouration of the electrochromic medium. However, the potential is likewise present at the power leads, as a result of which an electrochromic reaction also takes place along these and the leads likewise become coloured. This is undesirable since the image defined by the segments is considerably disrupted thereby.

It was an object of the invention to produce an electrochromic display device having segments which are individually connected to a power source, in which device the power leads to the segments to which a potential is being applied do not cause a colour reaction.

The object of the invention is achieved by an electrochromic display device comprising a pair of glass or plastic plates or plastic films of which at least one plate or film, preferably both plates or films, is/are provided on one side each with an electrically conductive coating and of which at least one plate or film and its conductive coating is transparent and of which the other can be mirrored and in which the electrically conductive layer of at least one of the two plates or films is divided into separate segments which are individually connected to a power source and each has an electric lead from one edge of the respective plate or film, where the plates or films are joined via a sealing ring on the sides on which they are conductively coated and the volume formed by the two plates or films and the sealing ring is filled with an electrochromic medium, characterized in that the electric leads to the segments are electrically insulated from the electrochromic medium. Due to different demands upon the electrochromic display device the division into seperate segments can be carried out differently. If only one sign or symbol shall be displayed, only one segment is prepared. Alternatively several segments can be prepared. The shape and number of the said several segments can be chosen, so that with the combination of these segments all kinds of signs like letters, figures, symbols, words, numbers and combinations thereof can be displayed. The shape of a single segment can be that of the sign itself or that of a rectangle, square, multiangle, circle, oval and/or other geometric object or combinations thereof.

The insulation can be achieved, for example, by the electric leads to the areas being coated with an electrically insulating layer. Preferably said electrically insulating layer is transparent.

As electrically conductive coatings on the glass plates or plastic plates or plastic films from which the electrochromic display device is constructed, it is in principle possible to use any electrically conductive materials. However, a transparent plate or film has to have a conductive coating which is itself transparent. Suitable, preferably transparent, materials are, for example, indium-tin oxide (ITO), antimony- or fluorine-doped tin oxide, antimony- or aluminium-doped zinc oxide, zinc oxide or conductive organic polymers such as substituted or unsubstituted polythienyls, polypyrroles, polyanilines, polyacetylene. In this way, a transmissive electrochromic device which can be viewed in transmitted light is obtained.

One of the plates or films can, however, also have a metallic, preferably opaque, electrically conductive coating. Suitable materials are copper, silver, gold, chromium, aluminium, palladium or rhodium or else palladium on chromium or rhodium on chromium or other metal combinations. In this way, a reflective electrochromic device is generally obtained.

To achieve an electrochromic display device, which reflects uniformly it is advantageous to coat the plates with a series of layers. The plate or film is coated uniformly with a mirroring material such as one of the above mentioned metals or combinations thereof. On this mirroring layer an electrically insulating layer, such as one of the below mentioned, is coated. On this electrically insulating layer another metallic layer comprising one of the above mentioned metals or combinations thereof is coated. From this metallic layer the segments and the electric leads are being formed. The production of the segments and the electric leads will be described below. The electric leads are coated with an electrically insulating layer as described below.

The mirroring materials can also be applied to the nonconductive, uncoated side of one of the above-described transparent and transparently conductively coated plates or films. In this case, the metal layer serves not as a conductor but only as a reflector. This also gives a reflective electrochromic device.

However, these materials can also be used in mixed form, e.g. a grid made of a metallic conductor which is, for example, coated with an ITO layer.

A preferred embodiment of the electrochromic display device of the invention is one in which the segments and the electric leads consist of the same electrically conductive material.

Such materials can, for example, be any of the abovementioned transparent and opaque conductive materials, e.g. ITO or gold, chromium or mixed materials such as the combination of a metallic grid with, for example, ITO.

A likewise preferred embodiment of the electrochromic display device of the invention is one in which the segments and the electric leads consist of different electrically conductive material.

In this case, the segments consist, for example, of one of the abovementioned transparent materials, e.g. ITO, and the leads consist of a material having a particularly good conductivity. The leads can be metallic leads, e.g. gold or palladium, or combined leads of a material such as ITO and a metallic conductor, e.g. gold, in the form of wires or grids.

The electric resistance of the electric leads is preferably as low as possible. Only if the electric resistance is low the intensity of colouring of the segments does not vary with the length of the electric leads to the segment. Preferred materials for electric leads are therefore metals or combinations of metals with another electrically conductive material. Also suitable, although not comprising a metal, are electric leads made out of ITO, if they have a big width.

The segments and their leads are first produced by removal of material from a continuous conductive coating on glass or plastic plates or films or are applied to the glass or plastic plates or films. The electrically insulating layer is subsequently applied to the leads.

The production of the segments and leads by removal of material can be carried out by mechanical removal of the conductive layer, for example by scoring, scratching, scraping or milling, or by chemical means, for example by etching using, for example, a hydrochloric acid solution of $FeCl_2$ and $SnCl_2$ or other agents such as $HNO_3$. The places at which the conductive layer is removed in this way can be controlled by means of masks, e.g. masks of photoresist. However, the electrically separate segments and leads can also be produced by targeted, e.g. by means of masks, application of the conductive layer, e.g. by sputtering or printing. All the techniques which have just been described are generally known from the production of liquid crystal displays (LCDs).

Another method to produce the segments and the electric leads and to shape the segments comprises the step of coating the electrically conductive layer with the electrically insulating layer. If only one segment is to be displayed, then an electrically isolating layer is coated as described below on an uniform conductive layer, so that it does not cover the segment, but all other parts of the conductive layer. If the segment is of the shape of a symbol, then the coating covers the conductive layer despite a part of the shape of that symbol.

The advantage of this method is the simplicity of the production of the segments, since a structuring of the conductive layer is avoided. Another advantage is, that no electric leads, which might have a high resistance are needed, but the whole conductive layer leads the current, so that the segments colour uniformly. This method allows to produce a segment, which might comprise several parts e.g. several letters for example via a mask after a model of the desired symbol. Changes in the design of the segments can be performed very easy, just by changing the shapes of the recesses in the electrically insulating layer. Even if the symbols have a complex shape and are fine-structured, a uniform colouring takes place.

If the electrochromic display device comprises several segments, which are to be switched seperately, then the conductive layer is devided into big parts with small strips in between, for example by the method of etching. Each part should be big enough to contain al least one segment and its electric connections. All these parts are being coated simultanously with an electrically isolating layer, so the segments, which are to be displayed, are not covered (see FIG. 5).

If an electrochromic display device comprises several segments, it is not always possible to find enough space to lead all the electric leads to the edge of the respective plate or film. In such a case it is preferable to contact the segments through the plate or the film. In the vicinity of the segment, which is to be contacted, the plate or film comprises a little hole through which the electric leads are connected to the electric conductive layer. The diameter of the small hole is preferably 0, 2 to 1 mm. The holes are produced by drilling, punching or etching, depending on the material of the plate or film.

Through the hole in the plate or film the electric lead is connected with the segment. At the back of the plate or film the electric leads are connected in conventional manner with wires or printed circuits. The diameter of the external cables can be chosen as large as necessary to avoid potential differences without affecting the design of the segments in the electrochromic display device.

The connection between a segment and the lead conducted trough the hole can be performed in different manners, e.g. with conducting varnish. In a preferred embodiment the inner part of the hole is coated with a conductive material and directly connected to the segment. To stabilize such a connection through the hole mechanically the wire at the back of the plate or film can be pasted over with the conductive varnish and the plate or film in the vicinity of the hole by an adhesive (see FIG. 7).

This type of electric connection allows to position the segments very close to each other, since no space is needed to lead the electric leads to the edge of the plate or film.

As electrically insulating layer according to the invention, use is made of an organic, macromolecular compound or an inorganic compound. Preferred organic compounds are adhesives and varnishes/paints.

The electrochromic media known from the prior art contain pairs of redox substances which, after reduction or oxidation, form coloured free radicals, radical cations or radical anions which are chemically reactive. As is known, for example, from Topics in Current Chemistry, Vol. 92, p. 1–44 (1980), such free radicals or radical ions can be sensitive to electrophiles or nucleophiles or other free radicals. For this reason, if an electrochromic device containing such an electrochromic medium is to have a high stability and survive several thousand switching cycles, it has to be ensured that the electrochromic medium is absolutely free of electrophiles, e.g. protons, nucleophiles and oxygen. Furthermore, it has to be ensured that such reactive species are not formed at the electrodes by electrochemical processes during operation of the electrochromic device.

However, the electrically insulating layer on the electric leads of the electrochromic cell has to contain, release or, when in contact with the electrochromic system, form no reactive constituents which react with the electrochromic substances or the species formed from them electrochemically, e.g. the abovementioned radical or radical ion species or the doubly reduced or doubly oxidized species which are formed electrochemically or are always present in equilibrium.

Suitable adhesives and varnishes/paints are epoxy and acrylate systems.

Epoxy adhesives are known, for example, from J. W. Muskopf, S. B. McCollister in Ullmann's Encyclopedia of Organic Chemistry, VCH Verlagsgesellschaft mbH, 5th edition, Vol. A 9, p. 547 ff, 1987. Curing can occur by an anionic or cationic mechanism.

Acrylic adhesives are known, for example from W. Dierichs et al. in Ullmann's Encyklopädie der technischen Chemie, VCH Verlagsgesellschaft mbH, 4th edition, Volume 14, p. 233 ff, 1977. Curing occurs by a free-radical mechanism which can be initiated by means of ultraviolet radiation with the aid of added photoinitiators.

The epoxy adhesive used according to the invention for the electrical insulation of the leads is a two-component or one-component adhesive. It is preferably a two-component epoxy adhesive in which, for example, one component contains an epoxide compound and the other component contains an amine, an anhydride or a Lewis acid or Lewis base or is a one-component epoxy adhesive which contains, for example, an epoxide compound and a capped Lewis or Brønsted acid or Lewis or Brønsted base which under the action of heat or light sets free a Lewis or Brønsted acid or Lewis or Brønsted base.

The epoxide component is preferably an epoxide of the formula

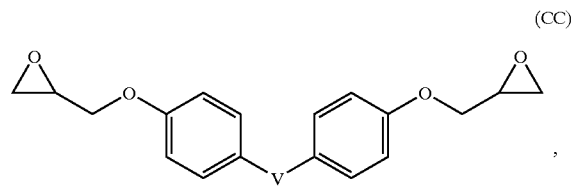

(CC)

where

V represents a bridge which may likewise bear epoxy groups, and the amine component is a primary or secondary aliphatic, cycloaliphatic, aromatic, araliphatic or heterocyclic, at least bifunctional amine and the Lewis acid which is present in capped form is a nonmetal halide and the Brønsted acid which is present in capped form is a strong protic acid which is derived from a nonmetal halide.

Such nonmetal halides are, for example, boron trifluoride, boron trichloride, phosphorus pentafluoride, arsenic pentafluoride, arsenic pentachloride, antimony pentafluoride or antimony pentachloride. The protic acids derived therefrom are then, for example, $HBF_4$, $HBCl_4$, $HPF_6$, $HAsF_6$, $HAsCl_6$, $HSbF_6$, $HSbCl_6$. Capped nonmetal halides are, for example, adducts of amines with these nonmetal halides, for example $BF_3.NH(C_2H_5)_2$, $BF_3.NH(CH_3)C_2H$, etc. Such compounds dissociate on heating to release the nonmetal halides. Tetrafluoroborates of aromatic or heterocyclic diazonium salts are also capped nonmetal halides. They dissociate photochemically to release $BF_3$. Diaryliodonium or triarylsulphonium salts containing anions of the abovementioned protic acids, e.g. $(C_6H_5)_2I^+PF_6^-$ dissociate photochemically to form the corresponding protic acids, e.g. HPF$_6$. Such capped products are known from, for example, R. S. Bauer in R. W. Tess, G. W. Poehlein (eds.) Applied Polymer Science, 2$^{nd}$ ed., ACS Symposium Series 285, ACS Washington, 1985, p. 931–961.

These adhesives can additionally contain other components such as glycidyl esters or glycidyl ethers, phenols or alcohols and, in the case of the photochemically curable adhesives, peroxides or ferrocene. Examples are glycidyl neodecanoate, hexanediol glycidyl ether, phenol, benzyl alcohol and cumene hydroperoxide.

Acrylate adhesives used according to the invention for the electrical insulation of the leads preferably comprise a bisacrylate and a trisacrylate component into which there is mixed a photoinitiator which liberates free radicals under the action of light in the UV region or the neighbouring blue spectral region.

The epoxide component is particularly preferably an epoxide of the formula

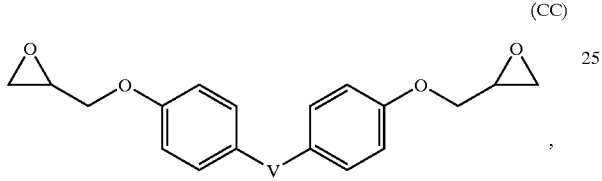

(CC)

where

V represents a bridge which can likewise bear epoxy groups, and the Lewis acid which is present in capped form is a nonmetal halide and the Brønsted acid which is present in capped form is a strong protic acid derived from a nonmetal halide.

Lewis and Brønsted acids and their capped forms are described in more detail above.

Likewise particularly preferably, the acrylate mixture comprises compounds of the formulae

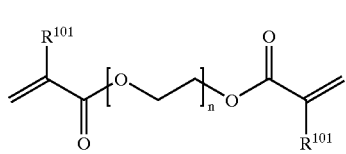

(CCI)

where n represents an integer from 0 to 20, preferably from 0 to 10 and

R$^{101}$ represents hydrogen or methyl and

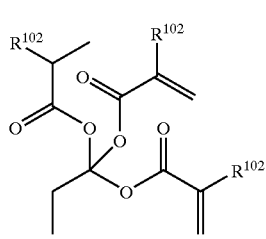

(CCII)

where

R$^{102}$ represents hydrogen or methyl.

The composition of the acrylate mixture of (CCI) and (CCII) is particularly preferably in the range (parts of CCI)/(parts of CCII) 1 to 5.

The photoinitiators are particularly preferably compounds based on benzophenone derivatives or thioxanthones which produce free radicals on photolysis. Photoinitiators are particularly preferably used for UV curing, for example Irgacure® 651 (Ciba-Geigy), Darocur® 1116, Darocur® 1173, Darocur® 1664, Darocur® 2273, Darocur® 4043 (all from E. Merck, Darmstadt). The particularly preferred concentration range of these photoinitiators is from 0.01 to 5% by weight.

The epoxide component of the epoxy adhesive used according to the invention is very particularly preferably an epoxide of the formula

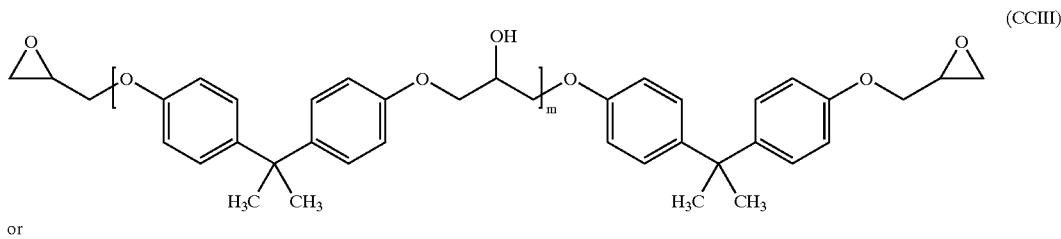

(CCIII)

or

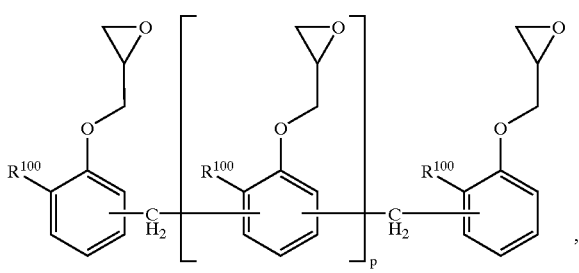

(CCIV)

where
  m and p each represent, independently of one another, an integer from 0 to 20, preferably from 0 to 5, and
  $R^{100}$ represents hydrogen or methyl
and the amine component is an aliphatic polyamine of the formula

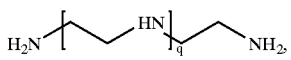

(CCV)

where
  q represents an integer from 2 to 10, preferably from 2 to 4, or
an araliphatic amine such as α,α'-diamino-m- or -p-xylene or polyaminoimidazoline or
an aromatic amine such as bis-(4-aminophenyl) methane or bis-(4-aminophenyl)) sulphone
and the capped Lewis acid is an adduct of boron trifluoride and a secondary amine, e.g. $BF_3$—NH($CH_3$)$C_2H_5$ or a diazonium salt such as Ar—$N_2I^+$ $BF_4^-$ or the capped Brønsted acid is an iodonium salt such as $(Ar)_2I^+BF_4^-$ or $(Ar)_2I^-PF_6^-$ or a sulphonium salt such as $(Ar)_3S^+BF_4^-$ or $(Ar)_3S^+PF_6^-$,
where
  Ar represents an aromatic radical, preferably phenyl.
Likewise very particularly preferably, the acrylates comprise a mixture of compounds of the formulae

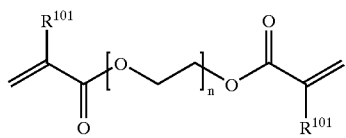

(CCI)

where
  n represents an integer from 0 to 20, preferably from 5 to 15, and
  $R^{101}$ represents hydrogen or methyl and

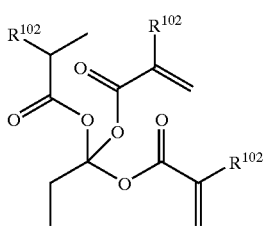

(CCII)

where
  $R^{102}$ represents hydrogen or methyl.
The composition of the acrylate mixture of (CCI) and (CCII) is very particularly preferably in the range (parts of CII)/(parts of CCII)=1 to 2.
The photoinitiators are very particularly preferably compounds based on benzophenone derivatives or thioxanthones which produce free radicals on photolysis. Very particular preference is given to using photoinitiators for UV curing, e.g. very particularly Darocur® 1173 (E. Merck, Darmnstadt) and Irgacure® 651 (Ciba-Geigy). The very particularly preferred concentration range of these photoinitiators is from 0.1 to 3% by weight.
Most particularly preferred thermally curing epoxy adhesives contain epoxides of the formula (CCIII), where
  m represents from 2 to 5,
  and amines of the formula (CCV),
    where
      q represents from 2 to 4,
      and α,α'-diamino-m-xylene or mixtures thereof and, if desired, further epoxide compounds such as glycidyl esters, for example, glycidyl neodecanoate, and/or glycidyl ethers, for example hexanediol glycidyl ether.
Most particularly preferred epoxy adhesives which cure photochemically or with photochemical initation contain epoxides of the formula (CCIII),
where
  m represents from 2 to 5,
  and a diazonium salt such as Ar—$N_2^+BF_4^-$ as capped Lewis acid or an iodonium salt such as $(Ar)_2^+BF_4^-$ or $(Ar)_2I+PF_6$ or a sulphonium salt such as $(Ar)_3S+BF_4^-$ or $(Ar)_3S^+$ $PF_6^-$as capped Brønsted acid,
  where
    Ar represents an aromatic radical, preferably phenyl.
Most particularly preferred photochemically curing acrylate adhesives contain acrylates of the formulae (CCI)
where
  represents from 5 to 10 and
  $R^{101}$ represents hydrogen and
  and (CCII)
    where
      $R^{102}$ represents hydrogen.
The most particularly preferred composition of the acrylate mixture of (CCI) and (CCII) is (parts of CCI)/(parts of CCII)=5/3.
The most particularly preferred photoinitiator Darocur® 1173 (E. Merck, Darmstadt) is used in a concentration of from 0.5% by weight.
The curing of the adhesives depends on their chemical composition.
Thermally curable epoxy adhesives based on epoxides of the formula (CCIII),
where
  m represents from 2 to 5,
  and amines of the formula (CCV),
    where
      q represents from 2 to 4,
      and α,α'-diamino-m-xylene or mixtures thereof and, if desired, further epoxide compounds such as glycidyl esters, for example glycidyl neodecanoate, are cured, for example, at temperatures of from 90 to 170° C., preferably from 110 to 150° C., over a period of, for example, from 5 to 60 minutes, preferably from 10 to 30 minutes.
Epoxy adhesives which cure photochemically or with photochemical initiation and are based on epoxides of the formula (CCIII),
where
  m represents from 2 to 5,
  and a capped Lewis acid, for example $NO_2$—$C_6H_4$—$N_2^+$ $BF_4^-$, or a capped Brønsted acid, for example $(C_6H_5)_2$ $I^-$ $BF_4^-$ or $(C_6H_5)_2I^+PF_6^-$ or $(C_6H_5)_3S^+BF_4^-$ or $(C_6H_5)_3$ $S^+PF_6^-$ are either completely cured by means of visible or UV light or, more advantageously, merely initiated by means of visible or UV light, without fully curing the adhesive, and then fully cured at room temperature or elevated temperature, for example at from 30 to 150° C., preferably from 70 to 130° C. The curing time depends on the temperature. Thus, for example, it can be from 10 to 24 hours at room temperature but only from 10 to 30 minutes at 110° C. Illumination can be carried out using a UV lamp, a flashlamp or possibly daylight or the light of daylight-type lamps.

In adhesives which have been cured in this way, the constituents of the adhesive, in particular the epoxide and amine constituents, are incorporated so firmly and completely into the macromolecular structure that they can no longer react with the electrochromic medium used according to the invention or the species formed by reduction or oxidation. The cured adhesives are also so stable that they withstand thermal stressing, for example at from −40 to +150° C., without problems and, in this temperature range, are also not dissolved, swollen or permeated by the electrochromic liquid used according to the invention.

Photochemically curable acrylate adhesives based on acrylates of the formulae (CCI)
where
n represents from 5 to 15 and
$R^{101}$ represents hydrogen and
and (CCII)
  where
  $R^{102}$ represents hydrogen
  having a composition of the acrylate mixture (parts of CCI)/(parts of CCII)=5/3 and a concentration of Darocur® 1173 photoinitiator of 0.5% by weight are fully cured at room temperature by means of UV light from a suitable lamp.

Adhesives which have been cured in this way withstand thermal stressing, for example at from −40 to +105° C., without problems and, in this temperature range, are also not dissolved, swollen or permeated by the electrochromic liquid used according to the invention.

The above-described adhesives are applied to the electric leads, for example by doctor blade coating or printing, and then cured as described above. However, the areas of the plates or films which do not have a conductive coating can also be covered partly or completely with this adhesive.

In the case of the photochemically curable adhesives, a different procedure can also be employed: they are applied to the entire area of the sides of the plates or films which have been conductively coated and divided into segments and electric leads. The electric leads are subsequently illuminated through a mask so that the adhesive cures at these places. The adhesive which has not been cured is subsequently removed from the unilluminated places, e.g. by means of a suitable solvent. In this procedure too, the areas of the plates or films which have not been conductively coated can be partly or completely illuminated and thus covered with cured adhesive.

It is also possible to use an inorganic compound as electrically insulating layer. Such inorganic layers are applied to the electric leads, for example by printing, sputtering or similar techniques. They can also be produced from precursors which have been applied to the leads, for example by thermolysis or oxidation.

Suitable inorganic insulating compounds are oxides, for example silicon oxide. Such oxides are applied, for example, by sputtering. Typical thicknesses of such oxide layers are, for example, from 10 to 5000 nm, preferably from 20 to 1000 nm.

If the electric leads are made from metal, then the electrically insulating layer can be an oxide of that metal. Preferably it is produced by oxidation of the surface of the metallic electric lead. The segments, especially if the are made of metal are covered by an adhesive film, by a photoresist or any other tight mask during the process of oxidation. The thickness of the oxide layer produced by the oxidation process should be thick enough to be insulating. The oxide layer should not contain any pinholes. An example for this kind of insulation is a conductive layer made of aluminum and an insulating layer made of aluminum oxide.

The electrochromic medium in the electrochromic device of the invention contains at least one pair of redox substances $OX_2$ and $REd_1$, of which one is reducible and the other is oxidizable and both are colourless or only slightly coloured and after application of an electric potential to the electrochromic device one substance is reduced and the other is oxidized so that at least one becomes coloured and after switching off the electric potential the two original redox substances are formed again and the electrochromic device loses its colour.

However, the reverse case can also apply, namely where at least one of the two electrochromic sustances is coloured and becomes colourless or changes colour as a result of reduction or oxidation at the cathode or anode respectively.

Suitable electrochromic substances are known, e.g. from D. Theis in Ullmann's Encyclopedia of Industrial Chemistry, Vol. A8, p. 622, Verlag Chemie 1987, U.S. Pat. No. 4,902,108, WO 97/30 134 and 97/30 135.

Preference is given to electrochromic media in which the electrochromic substances are present in solution, in gels or in solid layers; particular preference is given to solutions and gels.

Preference is given to electrochromic devices according to the invention in which
a) the reducible substance has at least one, preferably at least two, chemically reversible reduction waves in the cyclic voltammogram and the oxidizable substance correspondingly has at least one, preferably at least two, chemically reversible oxidation waves, or
b) the reducible substance and the oxidizable substance are covalently bound to one another via a bridge B, or
c) the reducible and/or oxidizable substances selected are ones in which the reversible transition between the oxidizable form and the reducible form or vice versa is associated with the rupture or formation of a σ bond, or
d) the reducible substance and/or the oxidizable substance are metal salts or metal complexes of metals which exist in at least two oxidation states, or
e) the reducible and/or oxidizable substances are oligomers and polymers which contain at least one of the redox systems mentioned, or else pairs of redox systems as defined under a) to d), or
f) the reducible and/or oxidizable substances used are mixtures of the substances described in a) to e), provided that these mixtures contain at least one reducible and at least one oxidizable redox system.

Selection of the electrochromic compounds $RED_1$ and $OX_2$ and/or mixtures thereof enables any monochrome colours to be produced. For a polychrome image, two or more such electrochromic devices can be laid on top of one another as layers, with each of these devices being able to produce a different colour. Such a stack is preferably built up in such a way that the devices which are in contact have a common translucent plate which is thus conductively coated on both sides and, depending on the design, is divided into segments. For example, a stack then comprises three electrochromic devices incorporating at least four plates. Switching on segments in various devices in this stack enables multicoloured displays to be achieved. If superimposed segments of various devices in such a stack are switched on, mixed colours are obtained. Thus, combination of three appropriate colours enables any colours to be produced, for example colour pictures.

Compounds $OX_2$ and $RED_1$ which are suitable for the purposes of the invention are substances which on reduction or oxidation at the cathode or anode respectively in the appropriate solvent give products $RED_2$ and $OX_1$ which undergo no subsequent chemical reaction but can be reoxidized or rereduced intact to form $OX_2$ and $RED_1$ again.

Suitable reducible substances $OX_2$ are, for example,

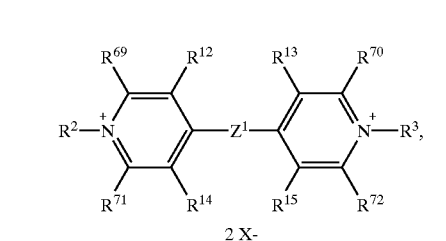
(II)
2 X-

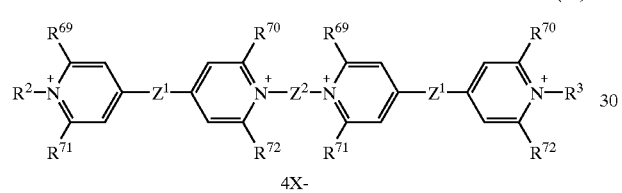
(III)
4X-

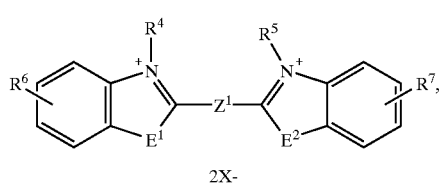
(IV)
2X-

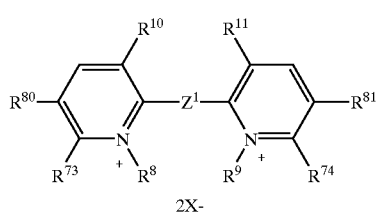
(V)
2X-

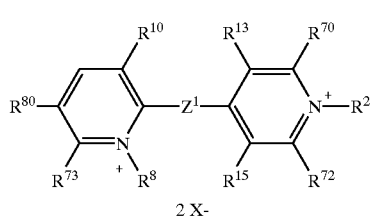
(IIa)
2 X-

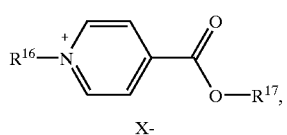
(VI)
X-

-continued

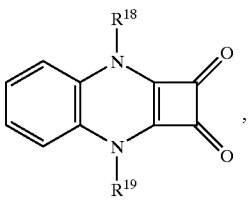
(VII)

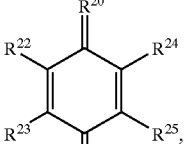
(VIII)

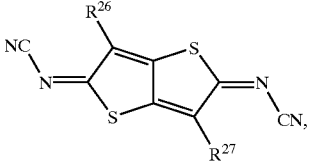
(IX)

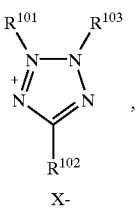
(CI)
X-

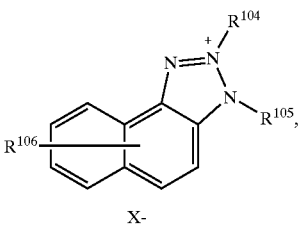
(CII)
X-

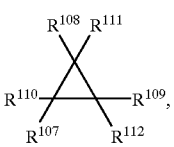
(CIII)

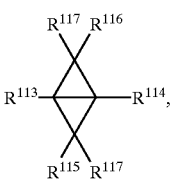
(CIV)

where $R^2$ to $R^5$, $R^8$, $R^9$, $R^{16}$ to $R^{19}$ are, independently of one another, $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl or $R^4$; $R^5$ or $R^8$; $R^9$ may together form a $-(CH_2)_2-$ or $-(CH_2)_3-$ bridge, $R^6$, $R^7$ and $R^{22}$ to $R^{25}$ are, independently of one another, hydrogen, $C_1$- to $C_4$-alkyl, $C_1$- to $C_4$-alkoxy, halogen, cyano, nitro or $C_1$- to $C_4$-alkoxycarbonyl or $R^{22}$; $R^{23}$ and/or $R^{24}$; $R^{25}$ may form a —CH=CH—CH=CH— bridge, $R^{10}$; $R^{11}$, $R^{10}$; $R^{13}$, $R^{12}$; $R^{13}$ and $R^{14}$; $R^{15}$ are, independently of one another, hydrogen or, in pairs, a —(CH$_2$)$_2$—, —(CH$_2$)$_3$— or —CH=CH— bridge, $R^{20}$ and $R^{21}$ are, independently of one another, O, N—CN, C(CN)$_2$ or N—C$_6$- to C$_{10}$-aryl, $R^{26}$ and $R^{27}$ are hydrogen, C$_1$- to C$_4$-alkyl, C$_1$- to C$_4$-alkoxy, halogen, cyano, nitro, C$_1$- to C$_4$-alkoxycarbonyl or C$_6$- to C$_{10}$-aryl, $R^{69}$ to $R^{74}$, $R^{80}$ and $R^{81}$ are, independently of one another, hydrogen or C$_1$- to C$_6$-alkyl or $R^{69}$; $R^{12}$, $R^{70}$; $R^{13}$, $R^{73}$; $R^{80}$ and/or $R^{74}$; $R^1$ together form a —CH=CH—CH=CH— bridge, $E^1$ and $E^2$ are, independently of one another, O, S, NR$^1$ or C(CH$_3$)$_2$ or $E^1$ and $E^2$ together form a —N—(CH$_2$)$_2$—N— bridge, $R^1$ is C$_1$- to C$_{18}$-alkyl, C$_2$- to C$_{12}$-alkenyl, C$_4$- to C$_7$-cycloalkyl, C$_7$- to C$_{15}$-aralkyl, C$_6$- to C$_{10}$-aryl, $Z^1$ is a direct bond, —CH=CH—, —C(CH$_3$)=CH—, —C(CN)=CH—, —CCl=CCl—, —C(OH)=CH—, —CCl=CH—, —C C—, —CH=N—N=CH—, —C(CH$_3$)=N—N=C(CH$_3$)— or —CCl=N—N=CCl—, $Z^2$ is —(CH$_2$)$_r$— or —CH$_2$—C$_6$H$_4$—CH$_2$—, r is an integer from 1 to 10, $R^{101}$ to $R^{105}$ are each, independently of one another, C$_6$- to C$_{10}$-aryl or an aromatic or pseudoaromatic, five- or six-membered heterocyclic ring which may optionally be benzo-fused, $R^{107}$, $R^{109}$, $R^{113}$ and $R^{114}$ are each, independently of one another, a radical of the formulae (CV) to (CVII)

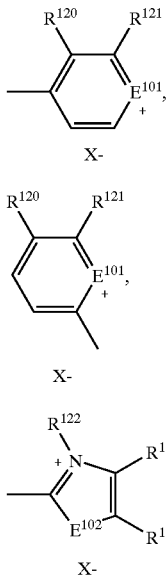

(CV)

(CVI)

(CVII)

$R^{108}$, $R^{115}$ and $R^{116}$ are each, independently of one another, C$_6$- to C$_{10}$-aryl or a radical of the formula (CV), $R^{110}$ to $R^{112}$, $R^{117}$ and $R^{118}$ are, independently of one another, hydrogen, C$_1$- to C$_4$-alkyl, halogen or cyano, $E^{100}$ and $E^{102}$ are, independently of one another, O, S or N—R$^{119}$, $R^{119}$ and $R^{122}$ are, independently of one another, C$_1$- to C$_{18}$-alkyl, C$_2$- to C$_8$-alkenyl, C$_4$- to C$_7$-cycloalkyl, C$_7$- to C$_{15}$-aralkyl or C$_6$- to C$_{10}$-aryl, $R^{106}$, $R^{120}$, $R^{121}$, $R^{123}$ and $R^{124}$ are, independently of one another, hydrogen, C$_1$- to C$_4$-alkyl, C$_1$- to C$_4$-alkoxy, halogen, cyano, nitro or C$_1$- to C$_4$-alkoxycarbonyl or $R^{120}$, $R^{121}$ or $R^{123}$, $R^{124}$ together form a —CH=CH—CH=CH— bridge and X$^-$ is an anion which is redox-inert under the conditions. Suitable oxidizable substances RED$_1$ are, for example,

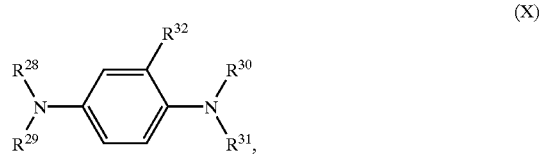

(X)

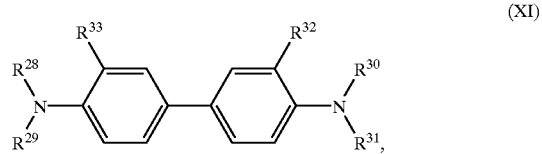

(XI)

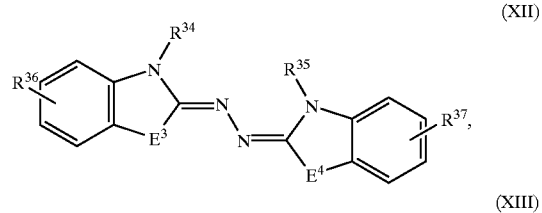

(XII)

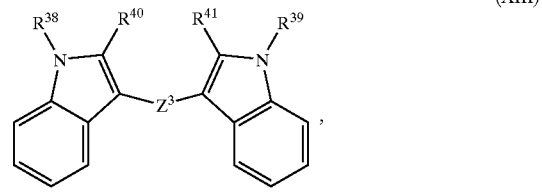

(XIII)

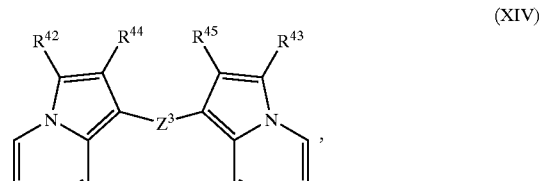

(XIV)

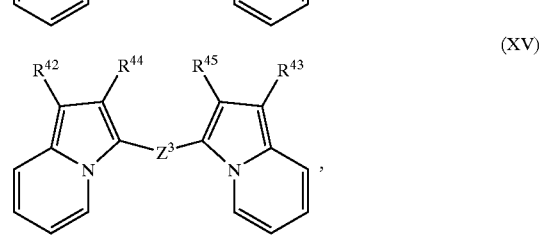

(XV)

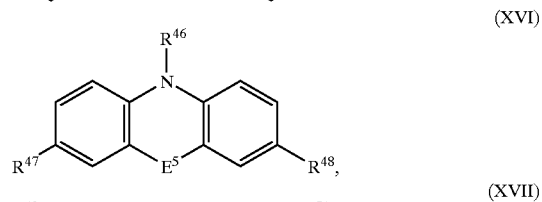

(XVI)

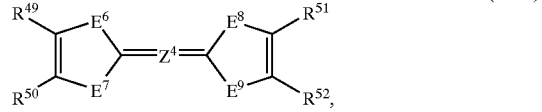

(XVII)

-continued

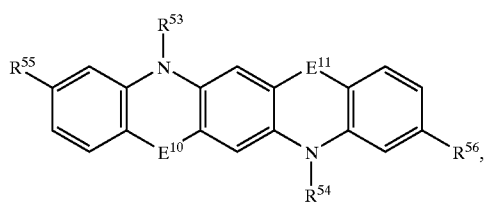
(XVIII)

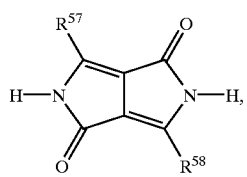
(XIX)

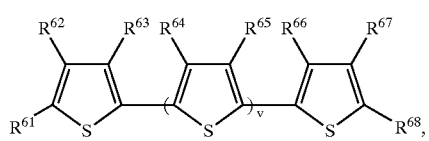
(XX)

where
$R^{28}$ to $R^{31}$, $R^{34}$, $R^{35}$, $R^{38}$, $R^{39}$, $R^{46}$, $R^{53}$, and $R^{54}$ are, independently of one another, $C_1$- to $C_{18}$-alkyl, $C_2$- to $C_{12}$-alkenyl, $C_4$- to $C_7$-cycloalkyl, $A_7$- to $C_{15}$-aralkyl or $C_6$- to $C_{10}$-aryl, $R^{32}$ to $R^{33}$, $R^{36}$, $R^{37}$, $R^{40}$, $R^{41}$, $R^{42}$ to $R^{45}$, $R^{47}$, $R^{48}$, $R^{49}$ to $R^{52}$ and $R^{55}$ to $R^{58}$ are independently of one another, hydrogen, $C_1$- to $C_4$-alkyl, $C_1$- to $C_4$-alkoxy, halogen, cyano, nitro, $C_1$- to $C_4$-alkoxycarbonyl, $C_6$- to $C_{10}$-aryl and $R^{57}$ and $R^{58}$ may also each be an aromatic or pseudoaromatic, five- or six-membered heterocyclic ring which may optionally be benzo-fused and $R^{48}$ may also be $NR^{75}R^{76}$ or $R^{49}$; $R^{50}$ and/or $R^{51}$; $R^{52}$ form a —$(CH_2)_3$—, —$(CH_2)_4$—, —$(CH_2)_5$— or —CH=CH—CH=CH— bridge, $Z^3$ is a direct bond, a —CH=CH— or —N=N— bridge, =$Z^4$= is a direct double bond, a =CH—CH= or —N—N= bridge, $E^3$ to $E^5$, $E^{10}$ and $E^{11}$ are, independently of one another, O, S, $NR^{59}$ or $C(CH_3)_2$ and $E^5$ may also be C=O or $SO_2$, $E^3$ and $E^4$ may also be, independently of one another, —CH=CH—, $E^6$ to $E^9$ are, independently of one another, S, Se or $NR^{59}$, $R^{59}$; $R^{75}$ and $R^{76}$ are, independently of one another, $C_1$- to $C_{12}$-alkyl, $C_2$- to $C_8$-alkenyl, $C_4$- to $C_7$-cycloalkyl, $C_7$- to $C_{15}$-aralkyl, $C_6$- to $C_{10}$-aryl, and $R^{75}$ may also be hydrogen or $R^{75}$ and $R^{76}$ in $NR^{75}R^{76}$ may also, together with the N atom to which they are bound, represent a five- or six-membered ring which may optionally contain further heteroatoms, $R^{61}$ to $R^{68}$ are, independently of one another, hydrogen, $C_1$- to $C_6$-alkyl, $C_1$- to $C_4$-alkoxy, cyano, $C_1$- to $C_4$-alkoxycarbonyl or $C_6$- to $C_{10}$-aryl and $R^{61}$; $R^{62}$ and $R^{67}$; $R^{68}$ may also, independently of one another, form a —$(CH_2)_3$—, —$(CH_2)_4$— or —CH=CH—CH=CH— bridge, and $R^{62}$; $R^{63}$, $R^{64}$; $R^{65}$ and $R^{66}$; $R^{67}$ form a —O—$CH_2CH_2$—O— or a —O—$CH_2CH_2CH_2$—O—bridge, and v is an integer from 0 to 10.000.

Likewise suitable as $RED_1$ are anions such as $I^-$, $I_3^-$, $Br^-$, $SCN^-$.

Examples of redox systems which are linked via a bridge B and may be oligomeric or polymeric are those of the formula

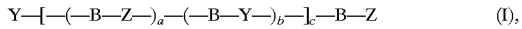
(I), where

Y and Z each represent, independently of one another, a radical $OX_2$ or $RED_1$, but at least one Y represents $OX_2$ and at least one Z represents $REd_1$, where
$OX_2$ represents the radical of a reversibly electrochemically reducible redox system, and
$RED_1$ represents the radical of a reversibly electrochemically oxidizable redox system, B represents a bridge, c represents an integer from 0 to 1000, and a and b each represent, independently of one another, an integer from 0 to 100.

$(a+b)*c$ is preferably $\leq 10,000$.

Here, the term reversibly electrochemically reducible or oxidizable means that electron transfer can occur in the sense of the above definition of $OX_2$ and $RED_1$ used according to the invention, either with or without a change in the σ skeleton.

In particular, the electrochromic compounds of the formula (I) are those of the formulae

 (Ia),

 (Ib),

 (Ic), or

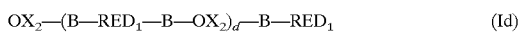 (Id)

where $OX_2$, $RED_1$ and B are as defined above and d represents an integer from 1 to 5.

$OX_2$ and $RED_1$ in the formulae (I) and (Ia) to (Id) are in particular radicals of the above-described redox systems of the formulae (II), (IIa) to (IX), (CI) to (CIV) and (X) to (XX), where bonding to the bridge B occurs via one of the radicals $R^2$ to $R^{19}$, $R^{22}$ to $R^{27}$, $R^{28}$ to $R^{58}$, $R^{61}$, $R^{62}$ $R^{67}$ $R^{68}$, $R^{122}$ or, if one of the radicals $E^1$ or $E^2$ represents $NR^1$ or one of the radicals $E^3$ to $E^{11}$ represents $NR^{59}$ or one of the radicals $E^{101}$ to $E^{102}$ represents $NR^{119}$, via $R^1$, $R^{59}$ or $R^{119}$ and the said radicals then represent a direct bond, and B represents a bridge of the formula —$(CH_2)_n$— or —$[Y^1_s(CH_2)_m—Y^2]_o—(CH_2)_p—Y^3_q$— which may be substituted by $C_1$- to $C_4$-alkyl, $C_1$- to $C_4$-alkoxy, halogen or phenyl, $Y^1$ to $Y^3$ represent, independently of one another, O, S, $NR^{60}$, COO, CONH, NHCONH, cyclopentanediyl, cyclohexanediyl, phenylene or naphthylene, $R^{60}$ is $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl, n is an integer from 1 to 12, m and p are each, independently of one another, an integer from 0 to 8, o is an integer from 0 to 6 and and s are, independently of one another, 0 or 1.

In another type of oligomeric or polymeric system, the groups $OX_2$ and/or $RED_1$ can also be bound, for example, as side chains to a main group, for example a poly(meth)acrylate, silicone, polycarbonate, polyurethane, polyurea, polyester, polyamide, cellulose or another oligomeric or polymeric system.

Examples of metal salts or metal complexes which can be used as $OX_2$ or $RED_1$ are $Fe^{3+/2+}$, $Ni^{3+/2+}$, $Co^{3+/2+}$, $Cu^{2+/+}$, $[Fe(CN)_6]^{3-/4-}$, $Fe_4[FE(CN)_6]_3^{0/4-}$, $[Co(CN)_6]^{3-/4-}$, $[Fe(cyclopentadienyl)_2]^{0/+}$, $Lu(Pc)^{2+\ to\ 2-}$ (Pc=phthalocyanine), $Fe[Fe(CN)_6]^{0/1-}$.

Possible counterions for metal ions and cationic complexes are all redox-inert anions $X^-$ as described in more detail below; possible counterions for the anionic complexes are all redox-inert cations $M'^+$, for example alkali metals or quaternary ammonium salts such as $Na^+$, $K^+$, $N(CH_3)_4^+$, $N(C_4H_9)_4^+$, $C_6H\ CH_2N(CH_3)_3^+$ and others Likewise preferred is an electrochromic device containing mixtures of the electrochromic substances mentioned above in general terms or as being preferred. Examples of such mixtures are (II)+(CI)+(XVI), (II)+(IV)+(XII), (Ia)+(II)+(XVI), (Ia)+(CI) without this implying any restriction.

The mixing ratios can be varied within wide limits. They allow the optimization of a desired colour shade or degree of blackness and/or the optimization of the desired dynamics of the device.

In the above definitions of substituents, alkyl radicals include radicals derived therefrom, e.g. alkoxy or aralkyl radicals, preferably those having from 1 to 12 carbon atoms, in particular from 1 to 8 carbon atoms, unless otherwise indicated. They can be linear or branched and may bear further substituents such as $C_1$- to $C_4$-alkoxy, fluorine, chlorine, hydroxyl, cyano, $C_1$- to $C_4$-alkoxycarbonyl or COOH.

Cycloalkyl radicals are preferably ones having from 3 to 7 carbon atoms, in particular 5 or 6 carbon atoms.

Alkenyl radicals are preferably ones having from 2 to 8 carbon atoms, in particular from 2 to 4 carbon atoms.

Aryl radicals, including those in aralkyl radicals, are phenyl or naphthyl radicals, in particular phenyl radicals. They can be substituted by from 1 to 3 of the following radicals: $C_1$- to $C_6$-alkyl, $C_1$- to $C_6$-alkoxy, fluoro, chloro, bromo, cyano, hydroxy, $C_1$- to $C_6$-alkoxycarbonyl or nitro. Two adjacent radicals may also form a ring.

For the purposes of the present invention, aromatic or pseudoaromatic, five- or six-membered heterocyclic rings which may optionally be benzo-fused are, in particular, imidazole, benzimidazole, oxazole, benzoxazole, thiazole, benzothiazole, indole, pyrazole, triazole, thiophene, isothiazole, benzoisothiazole, 1,3,4- or 1,2,4-thiadiazole, pyridine, quinoline, pyrimidine and pyrazine. They may also be substituted by from 1 to 3 of the following radicals: $C_1$- to $C_6$-alkyl, $C_1$- to $C_6$-alkoxy, fluoro, chloro, bromo, cyano, nitro, hydroxy, mono- or di-$C_1$- to $C_6$-alkylamino, $C_1$- to $C_6$-alkoxycarbonyl, $C_1$- to $C_6$-alkylsulphonyl, $C_1$- to $C_6$-alkanoylamino, phenyl or naphthyl. Two adjacent radicals can also form a ring.

The electrochromic substances are either known (Topics in Current Chemistry, Vol. 92, p. 1–44, (1980), Angew. Chem. 90, 927 (1978), Adv. Mater. 3, 225, (1991), DE-OS (German Published Specification) 3,917,323, J. Am. Chem. Soc. 117, 8528 (1995), J. C. S. Perkin 11 1990, 1777, DE-OS (German Published Specification) 4,435,211, EP-A 476,456, EP-A 476,457, DE-OS (German Published Specification) 4,007,058, J. Org. Chem. 57, 1849 (1992) and J. Am. Chem. Soc. 99, 6120, 6122 (1977) or can be prepared by analogous methods. The compounds of the formula (I) are likewise known (WO 97/30134) or can be synthesized from building blocks known per se, for example as shown in the following scheme:

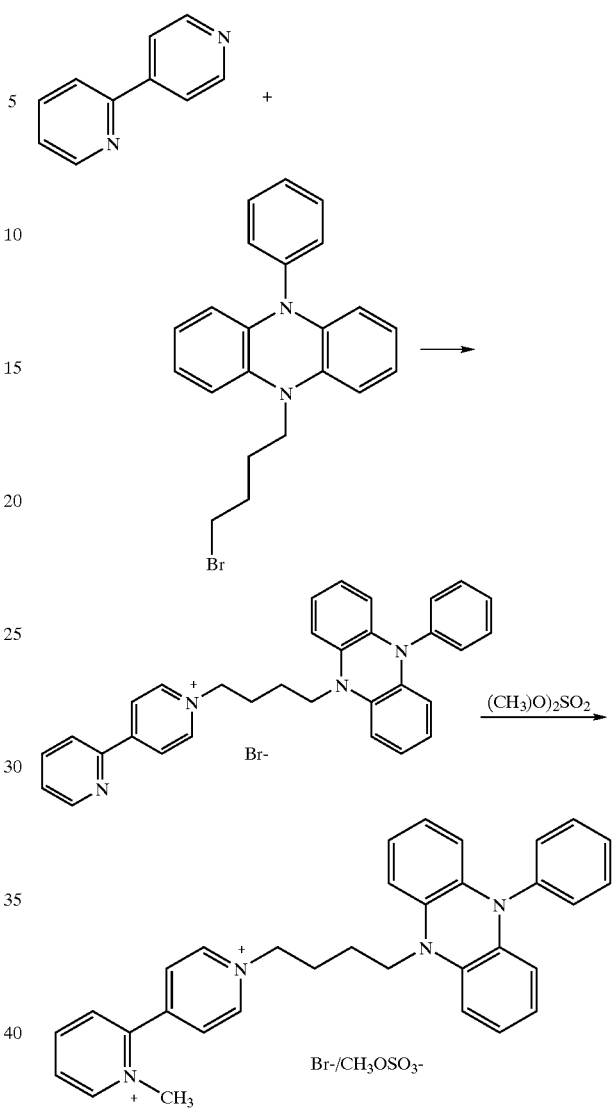

Ions such as bromide formed as a result of the synthetic method are subsequently replaced by redox-inert ions.

The electrochromic display device of the invention contains at least one solvent in which the electrochromic substances, if desired a conductive salt and, if desired, further additives. The solvent may also be thickened to form a gel, for example by means of polyelectrolytes, porous solids or nanosize particles having a large active surface area.

Suitable solvents are all solvents which are redox-inert under the electric potentials selected and cannot split off any electrophiles or nucleophiles or themselves react as sufficiently strong electrophiles or nucleophiles and thus be able to react with the coloured radical ions. Examples are propylene carbonate, γ-butyrolactone, acetonitrile, propionitrile, glutaronitrile, methylglutaronitrile, 3,3'-oxydipropionitrile, hydroxypropionitrile, dimethylformamide, N-methylpyrrolidone, sulpholane, 3-methylsulpholane or mixtures thereof. Preference is given to propylene carbonate and mixtures thereof with glutaronitrile or 3-methylsulpholane.

The electrochromic solution used for the purposes of the invention can contain at least one inert conductive salt. If, in particular, at least one of the substances of the redox pair $RED_1/OX_2$ is ionic in nature, the addition of a conductive salt can be omitted.

Suitable inert conductive salts are lithium, sodium and tetraalkylammonium salts, in particular the latter. The alkyl groups may have from 1 to 18 carbon atoms and be identical or different. Preference is given to tetrabutylammonium. Anions which are suitable for these salts, and also suitable as anions $X^-$ in the formulae (II) to (VI), (CI), (CII) and (CV) to (CVII) in in the metal salts are all redox-inert, colourless anions.

Examples are tetrafluoroborate, tetraphenylborate, cyanotriphenylborate, tetramethoxyborate, tetrapropoxyborate, tetraphenoxyborate, perchlorate, chloride, nitrate, sulphate, phosphate, methanesulphonate, ethanesulphonate, tetradecanesulphonate, pentadecanesulphonate, trifluoromethanesulphonate, perfluorobutanesulphonate, perfluorooctanesulphonate, benzenesulphonate, chlorobenzenesulphonate, toluenesulphonate, butylbenzenesulphonate, tert-butylbenzenesulphonate, dodecylbenzenesulphonate, trifluoromethylbenzenesulphonate, hexafluorophosphate, hexafluoroarsenate, hexafluorosilicate, 7,8- or 7,9-dicarbanido-undecaborate(−1) or (−2), which may bear one or two methyl, ethyl, butyl or phenyl groups as substituents on the B and/or C atoms, dodecahydro-dicarbadodecaborate (−2) or B-methyl-C-phenyl-dodecahydrodicarbadodecaborate(−1).

The conductive salts are preferably used in the range from 0 to 1 mol/l.

As further additives, it is possible to use thickeners in order to control the viscosity of the electroactive solution. This can be important for avoiding segregation, i.e. the formation of streaky or spotty colour on prolonged operation of the electrochromic device in the switched-on state, and to control the decolouration rate after switching off the power.

Suitable thickeners are all compounds customary for this purpose, e.g. polyacrylate, polymethacrylate (Luctite L®), polycarbonate or polyurethane.

Further possible additives for the electrochromic liquid are UV absorbers. Examples are UVINOL® 3000 (2,4-dihydroxybenzophenone, BASF), SANDUVOR® 3035 (2-hydroxy-4-n-octyloxybenzophenone, Clariant), Tinuvin® 571 (2-(2H-benzotriazol-2-yl)-6-dodecyl-4-methylphenol, Ciba), Cyasorb 24™ (2,2'-dihydroxy-4-methoxybenzophenone, American Cyanamid Company), UVINUL® 3035 (ethyl 2-cyano-3,3-diphenylacrylate, BASF), UVINUL® 3039 (2-ethylhexyl 2-cyano-3,3-diphenylacrylate, BASF), UVINUL® 3088 (2-ethylhexyl p-methoxycinnamate, BASF), CHIMASSORB® 90 (2-hydroxy-4- methoxybenzophenone, Ciba).

The last four examples mentioned are preferred. Likewise preferred are mixtures of UV absorbers, for example the last four examples mentioned. Preference is given to the mixture of UVINUL® 3039 (BASF) and CHIMASSORB® 90.

The UV absorbers are used in the range from 0.01 to 2 mol/l, preferably from 0.04 to 1 mol/l.

In the electrochromic solution, the electrochromic substances $OX_2$ and $REd_1$, in particular those of the formulae (I) to (XX) and (CI) to (CIV), are each present in a concentration of at least $10^{-4}$ mol/l, preferably from 0.001 to 0.5 mol/l. The total concentration of all electrochromic substances present is preferably less than 1 mol/l.

To operate the electrochromic display device of the invention, a constant, pulsed or variable-amplitude DC potential, for example a variable sinusoidal, rectangular or triangular DC potential is used.

However, it is also possible to use an AC potential, i.e. a potential whose polarity changes at a certain frequency. This voltage change can be rectangular, triangular, sinusoidal or of any other shape. In particular, the phases of opposite polarity can have different lengths.

The frequency of the AC potential or the pulsed or variable-amplitude DC potential can be in the range from $10^{-2}$ to $10^4$ Hz, preferably from $10^{-1}$ to $10^3$ Hz, particularly preferably from 10 to $5 \times 10^2$ Hz. The frequency can also be alterable during operation. A particularly preferred shape of the variable-frequency AC potential is the rectangular AC potential shown in FIG. 1 and also modifications thereof having the same frequency sequence but a triangular or sinusoidal shape.

The amplitude of the applied voltage depends on the desired depth of colour and on the reduction and oxidation potentials of the $OX_2$ and $RED_1$ used. Such potentials may be found in Topics in Current Chemistry, Volume 92, p. 1–44, (1980) or Angew. Chem. 90, 927 (1978) or the literature cited therein. The difference between the reduction and oxidation potentials provides a guideline for the required voltage, but the electrochromic display device can be operated at a lower or higher voltage. In many cases, e.g. when using $OX_2$=formula (II) or (IV) and $RED_1$=formula (X), (XII), (XVI) or (XVII) or when they are linked via a bridge as in formula (I), in particular formulae (Ia) to (Id), the voltage required for operation is $\leq 1$ V. Such electrochromic display devices can be supplied in a simple way with power from photovoltaic silicon cells.

When the electric potential is switched off, the electrochromic display device of the invention loses its colour again. This extinguishing of the colour can be accelerated by the segments or plates to which power is supplied being short-circuited. The display can also be extinguished very rapidly by repeatedly reversing the polarity of the applied potential, if desired while simultaneously reducing the potential.

The switching-on and switching-off times of the display device can be influenced within wide limits by variation of the layer thickness of the electrochromic display device, the viscosity of the electrochromic solution and/or by the selection of electrochromic substances with regard to their diffusion or drift behaviour. Thus, for example, thin layers have shorter switching times than thick ones. The size of the molecules of the electrochromic medium, in particular in the case of the systems bridged via B or the oligomeric or polymeric systems, influences the diffusion or drift behaviour. The larger the molecules, the lower their diffusion and drift. The charge on the molecules also influences the drift behaviour. The higher the charge on a molecule of given size, the greater the drift rate. It is thus possible to construct display devices which switch quickly and slowly and are optimally matched to the respective application.

The display device can be operated in a power-saving or refresh mode. In the power-saving or refresh mode, the DC potential or AC potential applied to the display device is interrupted every now and again. In the phases during which no voltage is applied, the contacts of the display device are not electrically connected. The phases during which voltage is applied and the phases during which no voltage is applied alternate and can be of identical or different duration. In a preferred operating mode, the phases during which the voltage is applied are shorter than the phases in which no voltage is applied. The ratio can be from 1:1.5 to 1:30, preferably from 1:2 to 1:10. The absolute duration of the phases can be very different and depends essentially on the construction of the display device. As the viscosity of the electrochromic medium and/or layer thicknesses of the display device increase, the absolute duration of the phases can increase. At layer thicknesses of from 100 to 400 µm, the phase duration can be in the range from 0.5 to 20 seconds. In the case of a low-viscosity electrochromic medium and/or when the layer thicknesses of the display device are small, e.g. from 5 to 50 µm, the absolute duration can be less than 1 second, for example from 0.001 to 0.5 second, preferably from 0.01 to 0.1 second. The phases in which no voltage is applied and therefore no current flows result, depending on the ratio of the phase lengths, in considerable savings of electric power. At a ratio of 1:9, for example, the power saving is 90% compared with continuous operation. Fluctuation or flickering of the intensity of the switched-on electrochromic display device or its segments or pixels and fuzziness of the segments or pixels caused by diffusion during the phases during which no voltage is applied are avoided by means of the construction of the display device and the absolute phase length matched thereto.

The display devices of the invention can be used as segmented or matrix displays in watches, clocks, computers, electric appliances, electronic appliances such as radios, amplifiers, TVs, CD players, in destination displays in buses and trains, in departure or arrival boards in railways stations and airports, in flat VDUs, in status displays such as indicators for the charging state of power sources, fill level displays or speed indicators.

Further applications are screens or panes such as window panes, partitions or eye-protection screens in offices, road vehicles, aircraft, trains, bank counters, door glazing, motorcycle or pilots' helmets, glazing of household appliances, mirrors of any type such as flat, spherical or aspherical or combinations thereof for road vehicles and trains, provided that these contain at least one switchable, static or variable display device. Possible displays in partitions can be"Please do not disturb" or "Position closed". In automobile mirrors, it is possible to display, for example, the outside temperature, the time, the compass bearing or malfunctions in the vehicle, for example information regarding the oil temperature or open doors.

FIGURES AND EXAMPLES

In the figures.

EXAMPLE 1

Figure 1:
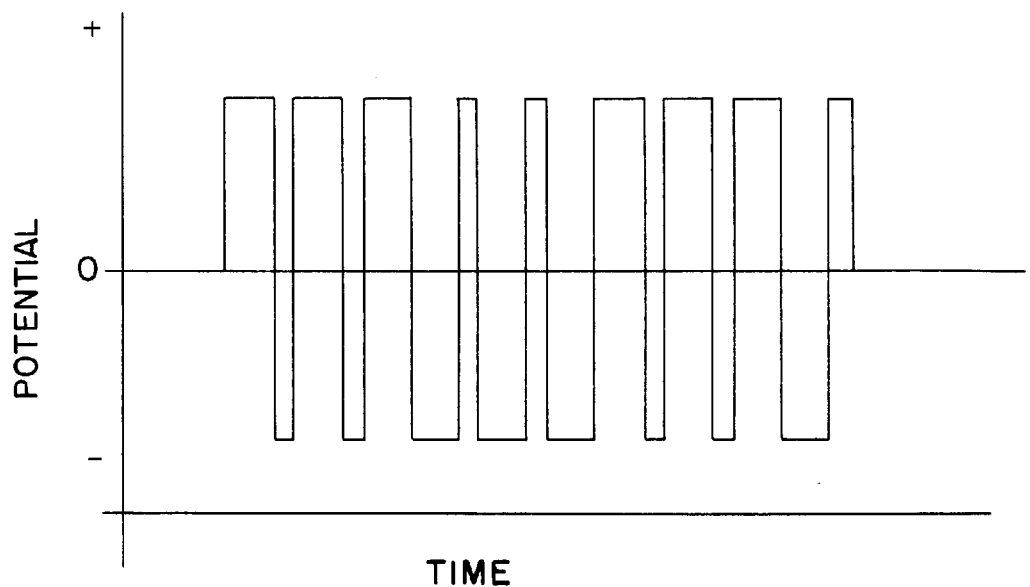
FIG. 1 shows a variable-frequency AC potential applied to the electrochromic display device as a function of time.
Figure 2:
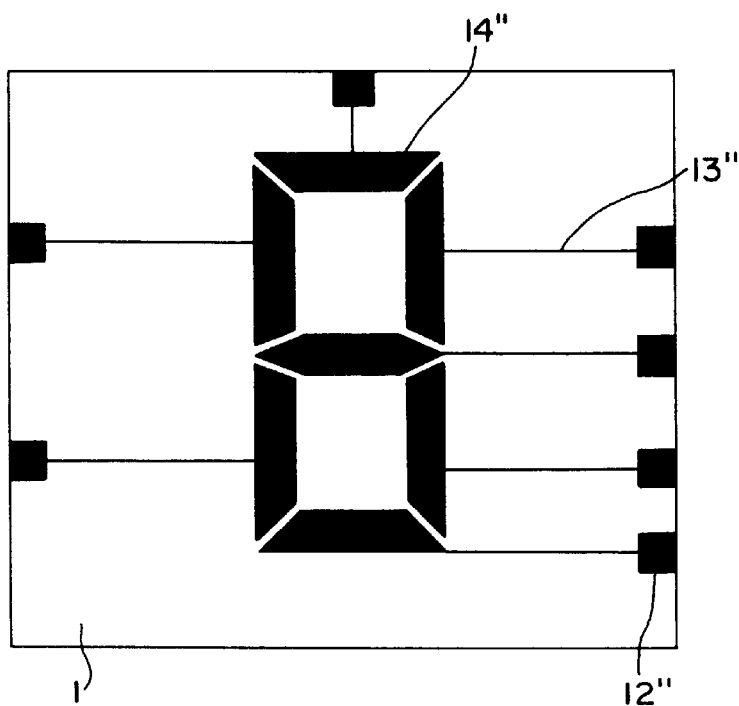
FIG. 2 shows an illumination mask printed with display segments, power leads and contacts for producing the conductive segments on the plates of the display device by means of UV illumination of photoresist and subsequent etching.

An ITO-coated glass plate was sprayed on the coated side with a commercial photoresist Positiv 20 from Kontakt Chemie, Iffezheim, and dried in the dark at from 50 to 70° C. for 1 hour. The layer of photoresist was then covered with an illumination mask 1 which contained the black regions in the form of display segments 14", power leads 13" and contacts 12" as shown in FIG. 2 in a transparent surrounding area. The illumination mask 1 was produced by printing a film by means of a laser printer in accordance with a master set up on a computer. The layer of photoresist was illuminated through the illumination mask 1 with the UV light of a mercury vapour lamp (HBO 200W/2 from Osram) for 3 minutes. The film was subsequently removed and the layer of photoresist was washed off at the illuminated places in an aqueous sodium hydroxide bath (7 g of sodium hydroxide per litre of water). The glass plate which had been prepared in this way was laid in a bath containing 67 g of $FeCl_2 \times 4H_2O$, 6 g of $SnCl_2 \times 2H_2O$, 104 ml of water and 113 ml of 37% strength by weight hydrochloric acid, whereby the ITO layer was dissolved at the photoresist-free, previously illuminated places. The remaining layer of photoresist was removed using acetone. After this treatment, the glass plate 11 shown in plane view in FIG. 3(a) and in side elevation in FIG. 3(b) bore segments 14, power leads 13 and contacts 12 of ITO.

Figure 3A:
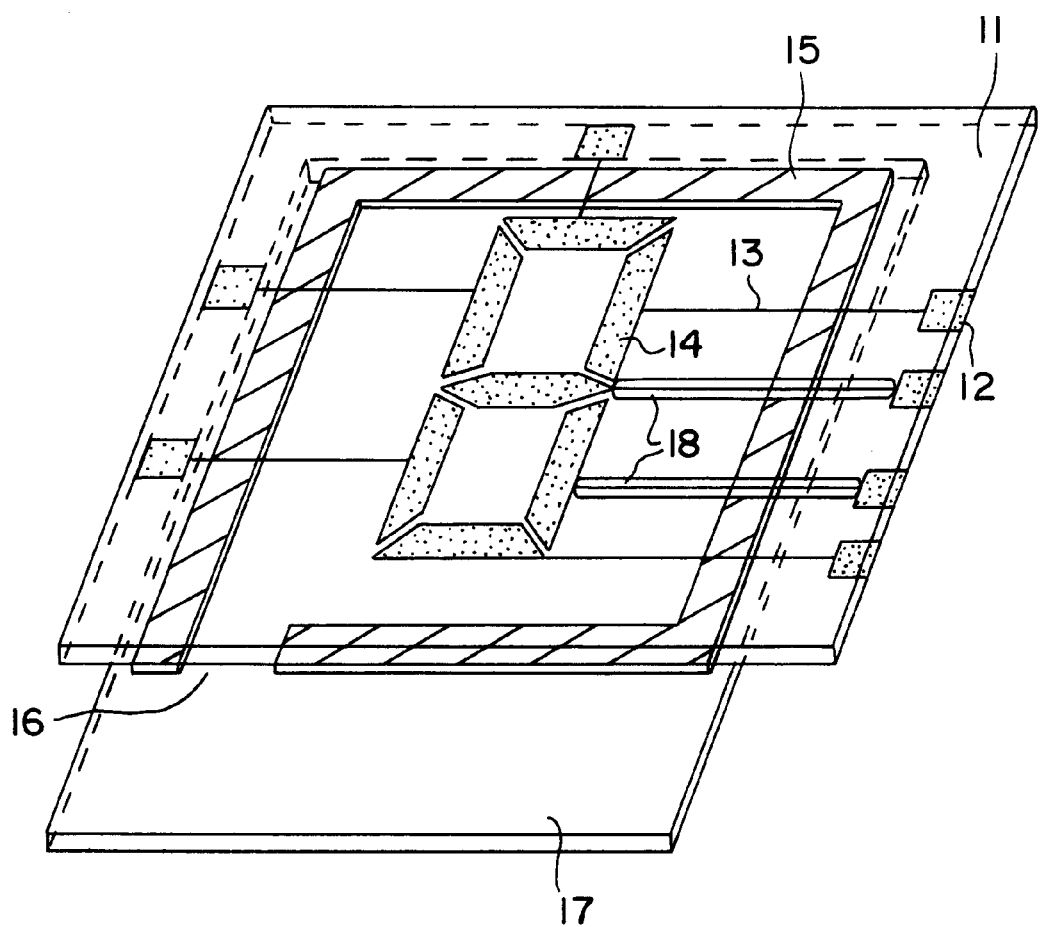
FIG. 3 shows an electrochromic display device with insulated electric leads in plan view (a) and in side elevation (b).
Figure 3B:
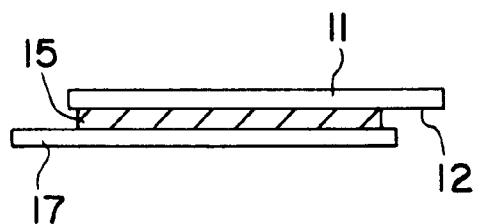

On the side of the plate 11 which had been conductively coated with ITO and etched, the power leads 13 were painted with a thin layer of the photo-curing epoxy adhesive DELO-Katiobond® 4594, DELO Industrieklebstoffe, Landsberg, using a brush. In FIG. 3(a), this covering 18 of the power leads 13 is only partly drawn in. When applying the epoxy adhesive, the vicinity of the power leads 13 was likewise covered with the adhesive while the segments 14 remained entirely free of adhesive. The curing of the adhesive was carried out by illumination for 10 minutes with daylight in the proximity of a window and subsequently for 20 minutes at 105° C. without illumination.

A mixture of 97% of photo-curing epoxy adhesive DELO-Katiobond® 4594, DELO Industrieklebstoffe, Landsberg, and 3% of glass spheres having a diameter of 50 µm was applied in the form of a peripheral strip 15 to the ITO-coated side of a second glass plate 17, with an opening 16 being left. The first glass plate 11 with its power leads insulated by the adhesive 18 was then laid on the bead of adhesive in such a way that the ITO layers of the two plates 11 and 17 faced one another and a geometry as shown in plan view in FIG. 3(a) and in side elevation in FIG. 3(b) was obtained. The curing of the adhesive was carried out by illumination for 10 minutes with daylight in the proximity of a window and subsequently for 20 minutes at 105° C. without illumination.

The cell was then, under a nitrogen atmosphere, stood vertically with the opening 16 downwards in a dish containing a solution which was 0.06 molar in the electrochromic compound of the formula

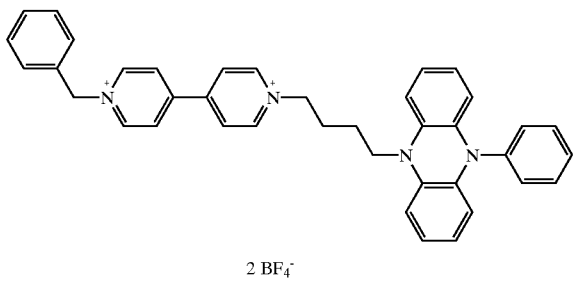

(CL)

2 BF$_4^-$ and 0.4 molar in the UV absorber of the formula

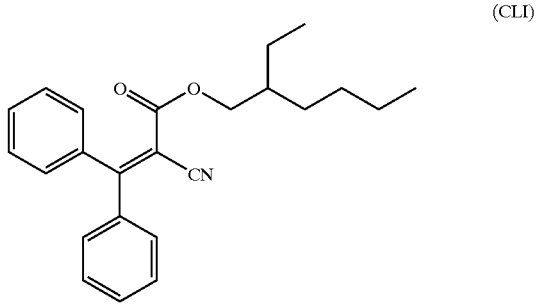

(CLI)

in anhydrous, oxygen-free propylene carbonate. The opening 16 of the cell was located between the surface of the liquid in the dish. The dish together with the cell was placed in a desiccator. The desiccator was evacuated to 0.05 mbar and nitrogen was then carefully admitted. During the admission of nitrogen, the electrochromic solution rose into the cell and filled the entire volume except for a small bubble. The cell was taken from the solution, the opening 16 was cleaned under a nitrogen atmosphere by wiping with a paper towel and was subsequently closed by means of the photocuring epoxy adhesive DELO-Katiobond® 4594, DELO Industrieklebstoffe, Landsberg, thickened with 2% of Aerosil silica gel. Finally, the epoxy adhesive was illuminted with daylight in the proximity of a window for 10 minutes and cured overnight at room temperature.

Another cell was treated as described above and the filling orifice was then closed using the photochemically curable acrylate adhesive DELO-Photobond® 4497, DELO Industrieklebstoffe, Landsberg. The acrylate adhesive was subsequently illuminated for 1 minute under a stream of nitrogen by means of a DELOLUX® 03 lamp, DELO Industrieklebstoffe, Landsberg, which was located a distance of 8 cm from the sealed opening 16, and cured overnight at room temperature under a nitrogen atmosphere. On application of an electric potential of 0.9 V to the contacts 12 of the segments as cathode and the unetched second plate 17 as anode, a deep greenish blue image of the segments being supplied with power was quickly produced. Thus, all letters and numbers capable of being represented by means of seven segments could be displayed as a deep greenish blue image against a pale yellow background. The power leads 13 did not acquire any colour. Switching off the voltage and short-circuiting the contacts made the image quickly disappear again.

EXAMPLE 1a

As an alternative, the cell could also be operated using an AC potential (sinusoidal) of 1.5 V and 200 Hz. The segments being supplied with power acquired a greenish blue colour against a pale yellow background. The power leads 13 did not acquire any colour.

EXAMPLE 1b

As an alternative, the cell could also be operated using an AC potential (rectangularly changing polarity of 1.5 V and 40 Hz. After 1 second, the voltage was switched off and on for 5 minutes in a 0.3 s/0.1 s cycle, with the contacts being open in the switched-off state. The segments being supplied with power acquired an intense blue-green colour against a pale yellow background and maintained their intensity and edge sharpness during the entire time of the test. The power leads 13 did not acquire any colour.

EXAMPLE 2

A cell was constructed as described in Example 1. However, a different adhesive was used for covering the power leads 13:

A two-component epoxy adhesive, KÖRAPOX® 439 from Kömmerling, Pirmasenz (component A: epoxide of the formula (CCIII) with mean value of m=2, glycidyl neodecanoate; component B: polyaminoimidazoline, tetraethylenepentamine, triethylenetetramine, benzyl alcohol, α,α'-diamino-m-xylene, phenol; A:B=2:1 parts by weight) was applied in a thin layer to the power leads 13 using a brush. The vicinity of the power leads 13 was likewise covered with the adhesive, while the segments 14 remained entirely free of adhesive. After curing at room temperature for minutes, the adhesive was cured for 20 minutes at 150° C.

This produced a cell (FIG. 3(a) and (b)) in which application of an electric potential of 0.9 V to the contacts 12 of the segments as cathode and the unetched second plate 17 as anode rapidly produced a deep greenish blue image of the segments being supplied with power. All letters and numbers able to be represented by means of seven segments could be displayed as a deep greenish blue image against a pale yellow background. The power leads 13 did not acquire any colour. Switching off the voltage and short-circuiting the contacts made the image rapidly disappear again.

EXAMPLE 3

A cell was constructed as described in Example 1. However, a different adhesive was used for covering the power leads 13:

A mixture of 3 parts of trimethylolpropane triacrylate, 5 parts of polyethylene glycol 400 diacrylate and 0.5 per cent by weight of UV initiator Darocur® 1173, E. Merck, Darmstadt, was applied in a thin layer to the power leads 13 using a brush. The vicinity of the power leads 13 was likewise covered with the adhesive, while the segments 14 remained entirely free of adhesive. The adhesive was cured under a nitrogen atmosphere by illumination for 1 minute with a DELOLUX® 03 lamp, DELO Industrieklebstoffe, Landsberg, which was located at a distance of 30 cm from the cell.

The cell was filled by the method described in Example 1 with a solution which was 0.03 molar in the electrochromic compound of the formula (CL)

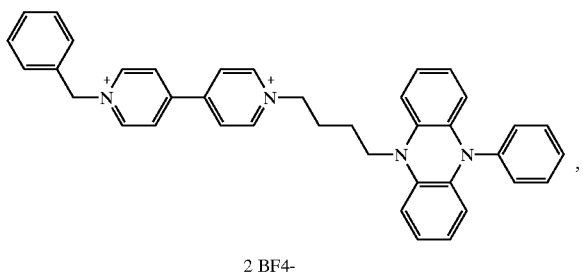

2 BF4-

0.03 molar in the electrochromic compound of the formula (CLII)

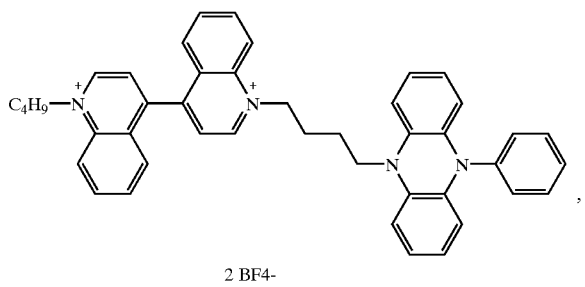

2 BF4-

0.1 molar in the UV absorber of the formula (CLI)

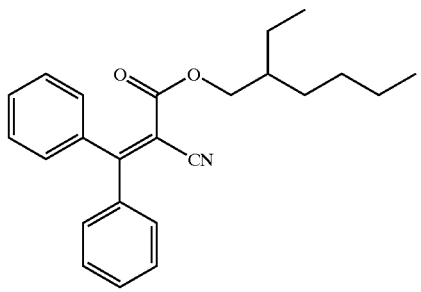

and 0.1 molar in the UV absorber of the formula (CLIII)

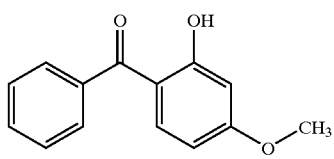

in anhydrous, oxygen-free propylene carbonate.

This produced a cell (FIG. 3(a) and (b)) in which application of an electric potential of 0.8 V to the contacts 12 of the segments as cathode and the unetched second plate 17 as anode rapidly produced a deep greenish blue image of the segments being supplied with power. All letters and numbers able to be represented by means of seven segments could be displayed as a black image against a pale yellow background. The power leads 13 did not acquire any colour. Switching off the voltage and short-circuiting the contacts made the image rapidly disappear again.

EXAMPLE 4

A cell was constructed as described in Example 1. However, the procedure used for covering the power leads 13 etched from the ITO layer was different from that in Example 1:

The plate 11 was, on the side which had been conductively coated with ITO and etched, painted over its entire area with the photochemically curable acrylate adhesive DELO-Photobond® 4468, DELO Industrieklebstoffe, Landsberg. The plate was then illuminated through a mask which had been produced like the mask in Example 1 but was completely black except for the regions of the power leads 13" (FIG. 2), for 3 minutes under a nitrogen atmosphere using a DELOLUX® 03 lamp, DELO Industrieklebstoffe, Landsberg, which was located at a distance of 8 cm from the cell, and the acrylate adhesive was subsequently cured in the absence of light for 3 hours under a nitrogen atmosphere. The plate 11 was washed with ethanol or acetone, thus removing the uncured adhesive around the power leads 13.

This produced a cell (FIG. 3(a) and (b)) in which application of an electric potential of 0.9 V to the contacts 12 of the segments as cathode and the unetched second plate 17 as anode rapidly produced a deep greenish blue image of the segments being supplied with power. All letters and numbers able to be represented by means of seven segments could be displayed as a deep greenish blue image against a pale yellow background. The power leads 13 did not acquire any colour. Switching off the voltage and short-circuiting the contacts made the image rapidly disappear again.

EXAMPLE 5

A cell was constructed as described in Example 1.

However, the cell was filled with a solution which was 0.06 molar in the electrochromic compound of the formula (CIV)

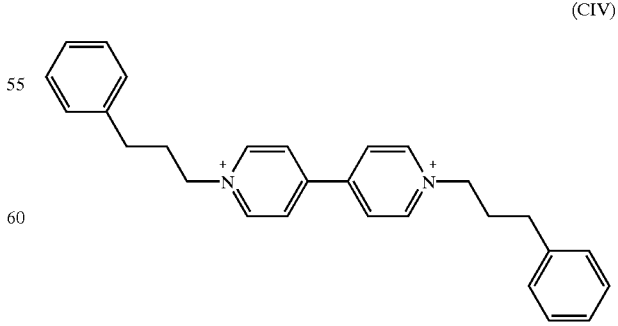

2 I- and 0.4 molar in the UV absorber of the formula

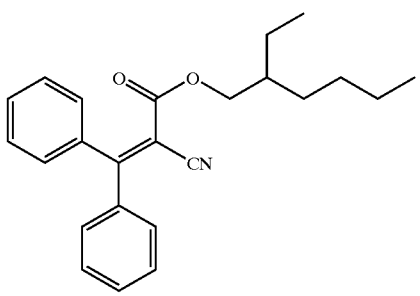

(CLI)

in anhydrous, oxygen-free propylene carbonate.

This produced a cell (FIG. 3(a) and (b)) in which application of an electric potential of 1.5 V to the contacts 12 of the segments as cathode and the unetched second plate 17 as anode rapidly produced a deep blue image of the segments being supplied with power. All letters and numbers able to be represented by means of seven segments could be displayed as a deep blue image against a colourless background. The power leads 13 did not acquire any colour. Switching off the voltage and short-circuiting the contacts made the image rapidly disappear again.

EXAMPLE 5a

As an alternative, the cell was operated using an AC potential of 2 V and 100 Hz. The segments being supplied with power then likewise acquired a blue colour against a colourless background.

EXAMPLE 6

Figure 4A:
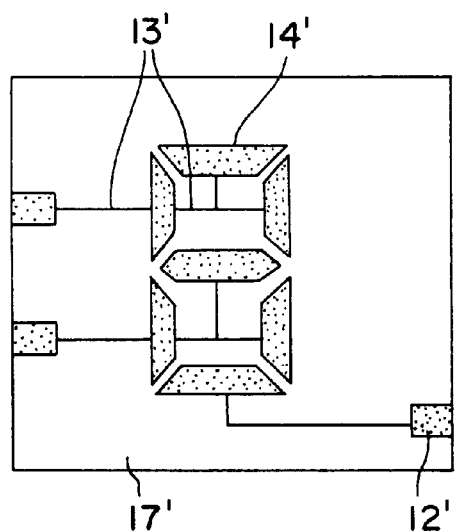
FIG. 4 shows the arrangement of display segments, power leads and contacts on the two plates of an electrochromic display device.
Figure 4B:
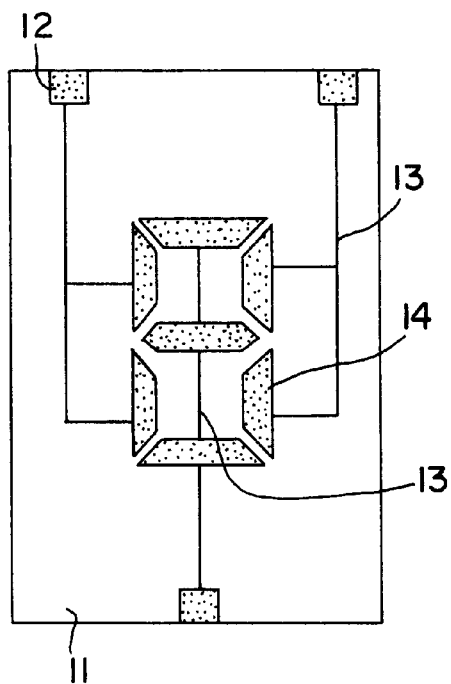

Two plates 11 and 17' were etched using the procedure described in Example 1 (FIG. 4). The insulating layer was applied to the leads 13 and 13' as described in Example 4.

For this purpose, the two plates 11 and 17' were painted with the photochemically curable acrylate adhesive DELO-Photobond® 4468, DELO Industrieklebstoffe, Landsberg, over the entire area of the side which had been conductively coated with ITO and etched. The plates were illuminated through appropriate masks which had been produced like the masks in Example 1 but in which only the contacts 12 and the segments 14 were black for 3 minutes under a nitrogen atmosphere by means of a DELOLUX® 03 lamp, DELO Industrieklebstoffe, Landsberg, which was located at a distance of 8 cm from the cell, and the acrylate adhesive was subsequently cured in the absence of light for 3 h under a nitrogen atmosphere. The plates 11 and 17' were washed with ethanol or acetone, thus removing the uncured adhesive from the contacts 12 and 12' and the segments 14 and 14'.

The electrochromic cell was then assembled as described in Example 1 using the two plates, locating the segments of the two plates so that they were coincident, and filled.

On application of an electric potential of 0.9 V to the contacts 12 of the plate 11 as cathode and the contacts 12' of the plate 17' as anode, a deep greenish blue image of the segments being supplied with power was quickly produced. Thus, all letters and numbers capable of being represented by means of seven segments could be displayed as a deep greenish blue image. The power leads 13 and 13' did not acquire any colour. Switching off the voltage and short-circuiting the contacts made the image quickly disappear again.

EXAMPLE 7

Two plates 11 and 17' were etched using the procedure described in Example 1. On both plates 11 and 17', the contacts 12 and 12' and the segments 14 and 14' on each of the conductively coated sides were glued off by means of adhesive tape (Tesa-Bürofilm 5013, Beiersdorf).

As a variant, the plates 11 and 17' were coated as described in Example 1 with the photoresist Positiv 20 from Kontakt Chemie, Iffezheim, over the entire conductively coated side. With the aid of illumination masks which each contained an image of the contacts 12 or 12' and the segments 14 and 14' as deep black elements, the plates 11 and 17' were covered in such a way that the segments 14 or 14' on the plates and their image on the masks were superimposed. The plates 11 and 17' which had been covered in this way were illuminated through the illumination masks as described in Example 1. The photoresist was subsequently removed at the illuminated places as described in Example 1.

$SiO_2$ was applied by sputtering to the plates 11 and 17' which had been prepared in this way according to one of the two variants. This was carried out in a sputtering apparatus BAS 410 from Balzers at a vacuum of $<10^{-6}$ mbar and an argon pressure of 3×10−3 mbar, using a heating power of 1 kW and a sputtering rate of 6 nm/min. The final thickness of the sputtered-on $SiO_2$ layer was 200 nm.

The adhesive tape was then pulled off or the photoresist was removed as described in Example 1.

The cell was was assembled as described in Example 1 using the two plates so that the segments of the two plates were coincident.

The cell was then, under a nitrogen or argon atmosphere, stood vertically with the opening 16 downward in a dish containing a solution which was 0.06 molar in the electrochromic compound of the formula

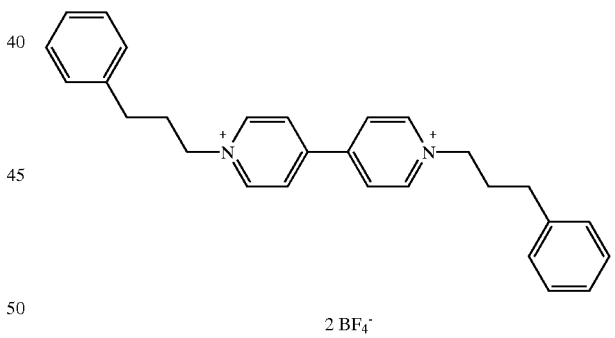

(CLV)

2 $BF_4^-$ and 0.06 molar in the electrochromic compound of the formula

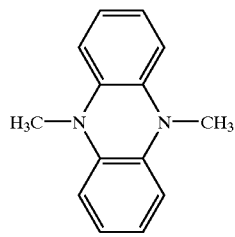

(CLVI)

and 0.4 molar in the UV absorber of the formula

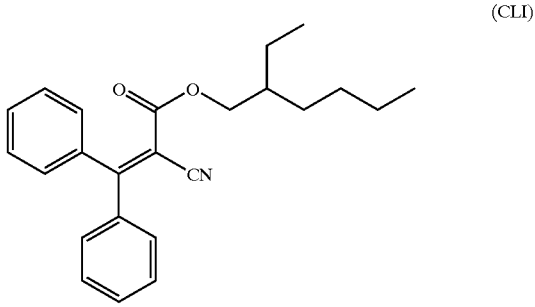

(CLI)

in anhydrous, oxygen-free propylene carbonate. The opening 16 of the cell was located between the surface of the liquid in the dish. The dish together with the cell was placed in a desiccator. The desiccator was evacuated to 0.05 mbar and nitrogen was then carefully admitted. During the admission of nitrogen, the electrochromic solution rose into the cell and filled the entire volume except for a small bubble. The cell was taken from the solution, the opening 16 was cleaned under a nitrogen atmosphere by wiping with a paper towel and was subsequently closed by means of the photo-curing epoxy adhesive DELO-Katiobond® 4594, DELO Industrieklebstoffe, Landsberg, thickened with 2% of Aerosil silica gel. Finally, the epoxy adhesive was illuminated with daylight in the proximity of a window for 10 minutes under a nitrogen atmosphere and cured overnight at room temperature.

Another cell was treated as described above and the filling orifice was then closed using the photochemically curable acrylate adhesive DELO-Photobond® 4497, DELO Industrieklebstoffe, Landsberg. The acrylate adhesive was subsequently illuminated for 1 minute under a stream of nitrogen by means of a DELOLUX® 03 lamp, DELO Industrieklebstoffe, Landsberg, which was located at a distance of 8 cm from the sealed opening 16, and cured overnight at room temperature under a nitrogen atmosphere.

On application of an electric potential of 0.9 V to the contacts 12 of the of the plate 11 as cathode and the contacts 12' of the plate 17' as anode, a deep greenish blue image of the segments being supplied with power was quickly produced. Thus, all letters and numbers capable of being represented by means of seven segments could be displayed as a deep greenish blue image. The power leads 13 and 13' did not acquire any colour. Switching off the voltage and short-circuiting the contacts made the image quickly disappear again.

EXAMPLE 7a

As an alternative, the cell was also operated using an AC potential (sinusoidal) of 1.5 V and 200 Hz. The segments being supplied with power acquired a greenish blue colour against a pale yellow background. The power leads 13 and 13' did not acquire any colour.

EXAMPLE 8

Figure 5A:
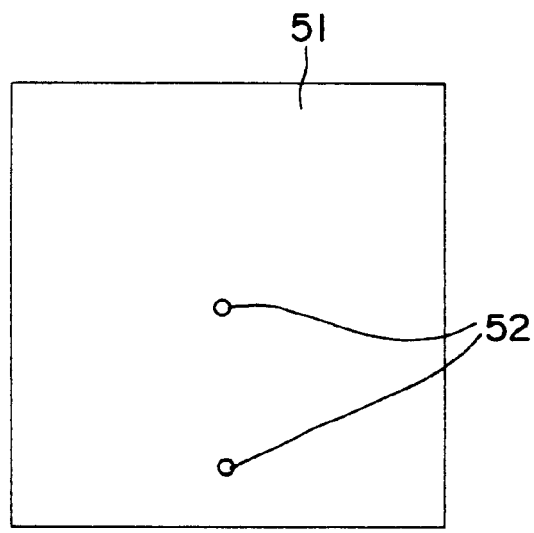
FIG. 5 shows a. glass plate of an electrochromic display device with two holes for the contacts;
b. illumination mask comprising black squares.

Two holes 52 with a diameter of 1.0 mm have been drilled into a glass-plate 51 (10×10 cm$^2$) (FIG. 5a). ITO has been sputtered onto the glass-plate at both sides and into the two holes.

Figure 5B:
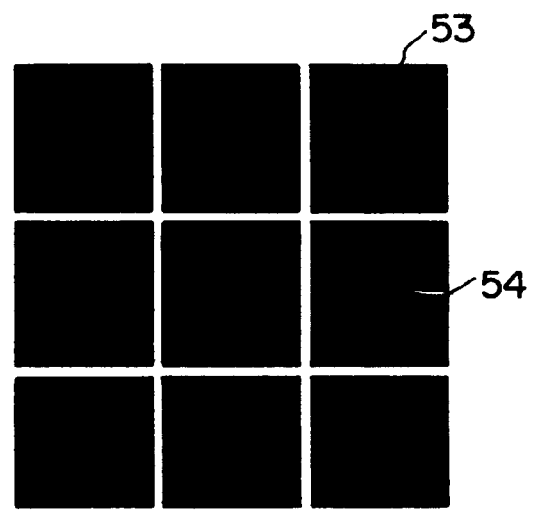
Figure 6A:
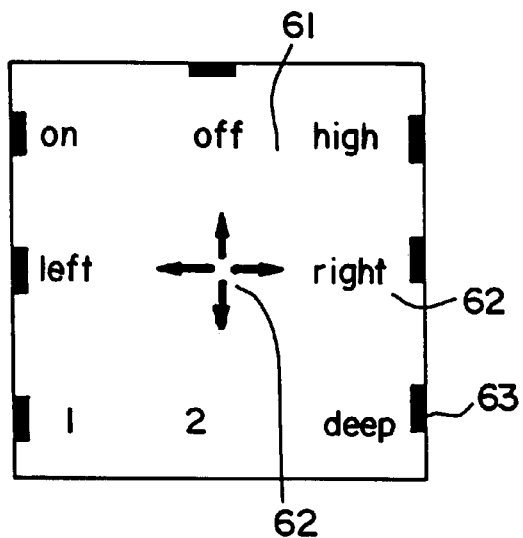
FIG. 6 shows a. illumination mask comprising black segments and electric connections;
b. glass plate comprising conductive segments and electric connections and two holes.

On one side of the glass-plate an area of 1×1 cm$^2$ around each hole was coverd with adhesive tape (Tesa-Film 5013, Fa. Beiersdorf). Onto the other side of the glass-plate usual in the trade photoresist (Positiv 20, Kontakt Chemie, Iffezheim) was sprayed and dried 1 hour at 50 to 70 ° C. in the dark. Then the photoresist was covered with the mask 53 (see FIG. 5b), which comprised black squares 54. The mask 53 in FIG. 5b had been produced by printing a computer designed model on a transparent film with a laser printer. The photoresist was exposed through the mask 53 with the UV-light of a mercury vapour lamp (HBO 200W/2 of Osram) for 3 minutes. Then the mask was removed and the exposed parts of the photoresist were rinsed in a bath of NaOH (7 g NaOH per litre of water). The glass-plate prepared in that way was put into a bath of 67 g FeCl$_2$x4 H$_2$O, 6 g SnCl$_2$x2 H$_2$O, 104 ml water and 113 ml of 37% in weight HCl. In this bath the ITO-layer was removed from the parts without photoresist, which had been exposed before. After that the remaining parts of the photoresist were removed with acetone. The adhesive film was also removed. Next the back of the plate was completely covered with adhesive tape. The other, edged side was again covered with photoresist. The photoresist was exposed by mask 61 (see FIG. 6a) as above described. Said mask 61 comprised black segments 62 in the shape of words and symbols (arrows) and parts for electric connection 63. The plate prepared in that way was sputtered with SiO$_2$ in a sputtering machine (BAS 410, Balzers) at a vacuum of <10$^{-4}$ mbar and a pressure of argone of 3×10$^{-3}$ mbar. The power of heating was 1 kW and the rate of sputtering 6 nm/min. The thickness of the sputtered layer SiO$_2$ was 200 nm. The remaining parts of photoresist were removed with acetone. The adhesive tape was removed as well.

Figure 6B:
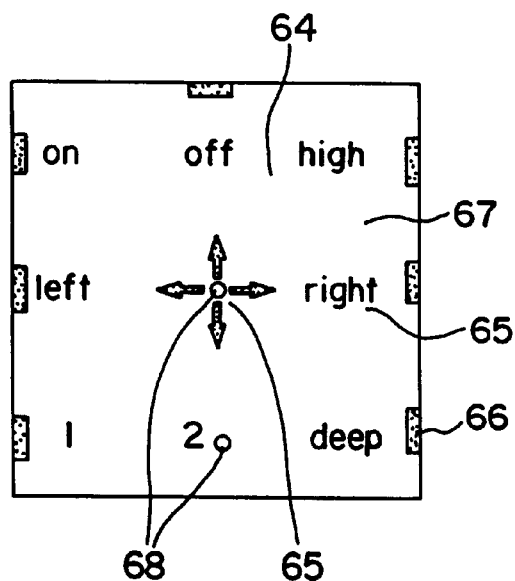
Figure 7:
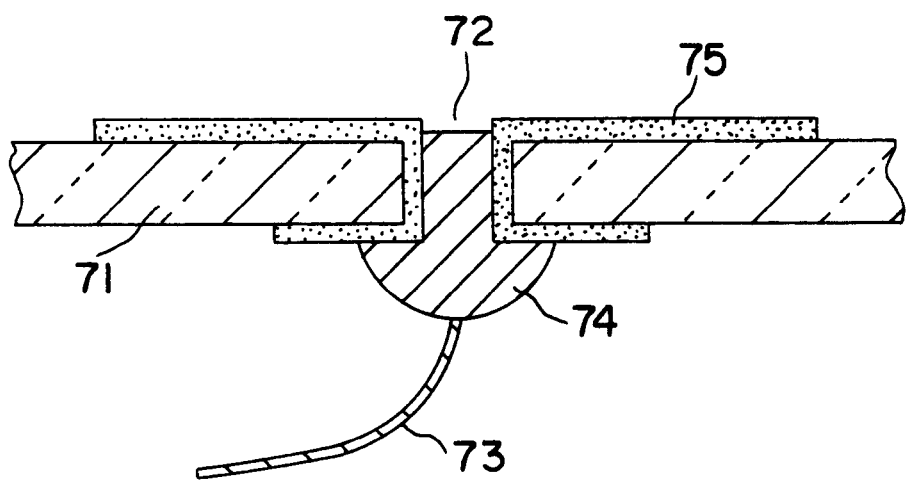
FIG. 7 shows side elevation of an electric contact with a wire through a hole in the glass plate.

The resulting glassplate 64 (see FIG. 6b), has segments 65 and electric connection parts 66, which were not coated with the insulating oxide, whereas all other parts of the surface 67 were coated with the insulating SiO$_2$ layer. Through the holes 68 a 0.5 mm copper wire was conducted from the back of the plate (see also FIG. 7, plate 71, hole 72, copper wire 73). The copper wire 73 was connected to the hole 72 and with the ITO-layer 75 with a drop of conductive silver 74.

With this plate an electrochromic cell was build up as described in example 1. The second plate had an rectangle shape and was connected to a cell with the first plate, such that the parts for electric connection 66 (FIG. 6b) are not covered by the other plate (see FIG. 3a and 3b). The cell was filled and closed as described in example 1. To the electric connections 66 and to the hanging over edge of the second plate copper wires were solded with conductive silver.

A voltage of 0,9 V was applied to the segments as cathode and to the second plate, which was not etched, as anode. With the applied voltage very soon a dark green picture of the connected segments appeared. The segments, which were not electrically connected remained colourless. After switching off the voltage and shortcutting the connecting wires, the picture quickly disappeared.

What is claimed is:

1. Electrochromic display device comprising a pair of glass or plastic plates or plastic films of which at least one plate or film is/are provided on one side each with an electrically conductive layer and of which at least one plate or film and its conductive layer is transparent and of which the other can be mirrored and in which the electrically conductive layer of at least one of the two plates or films is divided into separate segments which are individually connected to a power source and each seperate segment has an electric lead from one edge of the respective plate or film, where the plates or films are joined via a sealing ring on the sides on which they are conductively coated and the volume formed by the two plates or films and the sealing ring is filled with an electrochromic medium, characterized in that the electric leads to the segments are electrically insulated from the electrochromic medium, and further characterized in that at least one part of the electrically conductive layer or at least one segment is electrically connected through a hole in the plate or film.

2. Electrochromic display device according to claim 1, characterized in that the electric leads to the segments are coated with an electrically insulating layer.

3. Electrochromic display device according to claim 2, characterized in that the electrically insulating layer is transparent.

4. Electrochromic display device according to claim 1, characterized in that an organic, macromolecular compound is used as electrically insulating layer to electrically insulate the electric leads from the electrochromic medium.

5. Electrochromic display device according to claim 4, characterized in that the macromolecular compound used is an adhesive or varnish/paint.

6. Electrochromic display device according to claim 5, characterized in that the adhesive used is an epoxy adhesive which cures thermally or photochemically or thermally after photochemical initiation.

7. Electrochromic display device according to claim 6, characterized in that the photo-curable adhesive used is a photochemically curing acrylate adhesive or an epoxy adhesive which cures photochemically or at room temperature after photochemical initiation.

8. Electrochromic display device according to 1, characterized in that an inorganic compound is used as an electrically insulating layer to electrically insulate the electric leads from the electrochromic medium.

9. Electrochromic display device according to claim 8, characterized in that an oxide is used as electrically insulating layer.

10. Electrochromic display device according to claim 9, characterized in that silicon dioxide is used as electrically insulating layer.

11. Electrochromic display device according to claim 9, characterized in that the electric leads are made of metal and that the electrically insulating layer consists of an oxide of said metal.

12. Electrochromic display device according to claim 1, characterized in that the electrochromic medium contains at least one pair of redox substances, of which one is reducible and the other is oxidizable and both are substantially colourless and after application of an electric potential to the electrochromic device one substance is reduced and the other is oxidized so that at least one becomes coloured and after switching off the electric potential the two original redox substances are formed again and the electrochromic device loses its colour.

13. Method of producing an electrochromic display device according to claim 1, characterized in that the segments and their power leads are first produced by removal of material from a continuous conductive coating or are applied to the plates or films and the electrically insulating layer is subsequently applied to the power leads.

14. Method of producing an electrochromic display device according to claim 13, characterized in that the electrically insulating layer applied to the power leads is adhesive or varnish/paint which is cured after application.

15. Method of producing an electrochromic display device according to claim 14, characterized in that a photo-curable adhesive is applied to the entire area of the conductively coated side of the plate or film, the areas of the power leads are illuminated, thus curing the adhesive at the illuminated places, and the uncured adhesive is subsequently removed from the unilluminated places.

16. Method of producing an electrochromic display device according to claim 13, characterized in that silicon dioxide is sputtered as electrically insulating layer onto the power leads.

17. Method of producing an electrochromic display device according to claim 13, characterized in that the power leads are made of metal and that said metallic power leads are oxidized at the surface to produce the electrically isolating layer.

18. Electrochromic display device comprising a pair of glass or plastic plates or plastic films of which at least one plate or film is/are provided on one side each with an electrically conductive coating and of which at least one plate or film and its conductive coating is transparent and of which the other can be mirrored and where the plates or films are joined via a sealing ring on the sides on which they are conductively coated and the volume formed by the two plates or films and the sealing ring is filled with an electrochromic medium, characterized in that at least the electrically conducting layer of one of the plates is coated with an electrically isolating layer, which does not cover certain segments of the electrically conductive layer, and further characterized in that at least one part of the electrically conductive layer or at least one segment is electrically connected through a hole in the plate or film.

19. The electrochromic display device according to claim 18, characterized in that the electrically conductive layer is uniform or separated into parts, whereas each part has at least the size of the segment to be displayed and its electric connections and that on the uniform or seperate into parts conductive layer an electrically insulating layer is coated, such that it does not cover certain segments of the electrically conductive layer.

20. Method of operating an electrochromic display device according to claim 1 or 18, characterized in that the display device is operated using a constant, pulsed or variable-amplitude DC potential.

21. Method of operating an electrochromic display device according to claim 20, characterized in that the frequency of the pulsed DC potential is in the range of from $10^{-2}$ to $10^4$ Hz.

22. Method of operating an electrochromic display device according to claim 20, characterized in that the frequency of the pulsed DC potential can be altered over time.

23. The method of claim 20, wherein said DC potential is selected from a variable sinusoidal, rectangular or triangular DC potential.

24. Method of operating an electrochromic display device according to claim 1 or 18, characterized in that the display device is operated using an AC potential whose potential-time curve is sinusoidal, rectangular or triangular.

25. The method of claim 24, wherein said AC potential has a frequency in the range from $10^{-2}$ to $10^4$ Hz.

26. The method of claim 21 or 25, wherein said frequency is in the range of $10^{-1}$ to $10^3$ Hz.

27. The method of claim 26, wherein said frequency is in the range of 10 to $5 \times 10^2$ Hz.

28. The method of claim 24, wherein said AC potential can be altered over time.

29. Method of operating an electrochromic display device according to claim 1 or 18, characterized in that it is operated in a power-saving or refresh mode in which operation using a DC potential or operation using an AC potential is interrupted every now and again so that there is no electrical potential applied to the contacts during the phases when no voltage is applied and the contacts are open during these phases when no voltage is applied.

30. Method of operating an electrochromic display device according to claim 29, characterized in that the phases during which a voltage is applied are shorter than the phases during which no voltage is applied and the ratio of the duration of the phases when voltage is applied to the duration of the phases when no voltage is applied is from 1:1.5 to 1:30.

31. The method of claim 30, wherein the ratio of the duration of the phases when voltage is applied to the duration of the phases when no voltage is applied is 1:2 to 1:10.

* * * * *